US006286002B1

(12) United States Patent
Axaopoulos et al.

(10) Patent No.: US 6,286,002 B1
(45) Date of Patent: *Sep. 4, 2001

(54) SYSTEM AND METHOD FOR STORING AND SEARCHING BUY AND SELL INFORMATION OF A MARKETPLACE

(75) Inventors: Jack Axaopoulos, Fuquay Varina, NC (US); James F. Carpenter, Jr., Gainesville; Douglas L. Peckover, Dallas, both of TX (US)

(73) Assignee: @YourCommand, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,470
(22) Filed: Nov. 14, 1997

Related U.S. Application Data

(60) Provisional application No. 60/057,685, filed on Aug. 27, 1997, provisional application No. 60/052,373, filed on Jul. 11, 1997, provisional application No. 60/050,411, filed on Jun. 20, 1997, and provisional application No. 60/047,341, filed on May 21, 1997.

(51) Int. Cl.[7] ...................................................... G06F 17/30
(52) U.S. Cl. ................................ 707/10; 707/3; 707/100; 705/26
(58) Field of Search ............................ 707/10, 1–6, 104; 705/26.14, 35–40, 7–10, 26, 27; 395/200.47, 200.48

(56) References Cited

U.S. PATENT DOCUMENTS

| 4,817,080 | 3/1989 | Soha ........................................ 370/17 |
| 4,984,155 | 1/1991 | Geier et al. ........................... 364/401 |
| 4,992,940 | 2/1991 | Dworkin ............................... 364/401 |
| 4,999,806 | 3/1991 | Chernow et al. ..................... 364/900 |
| 4,999,833 | 3/1991 | Lee ...................................... 370/94.1 |

(List continued on next page.)

OTHER PUBLICATIONS

"Visualizing teh World–Wide Web with teh Navigational View Builder," Sougata Moukherjea et al., COmputer Networks and ISDN Systems, pp. 1075–1087, Apr. 1995.*
"Nomads on teh Net," David Aubrey, Computer Shopper, v15, n12, pp. 616–620, Dec. 1995.*
Cheong, Fah–Chun, "Internet Agents: Spiders, Wanderers, Brokers, and Bots", New Riders Publishing, 1996, pp. ii, iv–xiv, 1, 3–35, 183, 185–226.
Chaum, D. "Achieving Electronic Privacy", Scientific American, Aug. 1992, pp. 96–101, copy supplied printed from world wide web site "http://digicash.support.nl/publish/sciam.html" on Apr. 3, 1997 (8 pages).

(List continued on next page.)

Primary Examiner—Hosain T. Alam
(74) Attorney, Agent, or Firm—Haynes and Boone, LLP

(57) ABSTRACT

A method of accessing a database using a computer system. One example of the method includes the following steps. Access a tree data structure. The tree data structure includes a set of nodes linked in parent, child and sibling relations. Each node of a subset of nodes is associated with a corresponding term. Select some nodes of the set of nodes. This includes selecting a node of the set of nodes. The node has at least a sibling node. In response to selecting the node, performing one of the following actions. If the node is a first type of node, allowing a selection of the sibling node. If the node is a second type of node, not allowing a selection of the sibling node. Record a list of node selections corresponding to the selection of some nodes. Extract a set of terms from the list of node selections. Create a data structure including price information and duration of existence information. Store the data structure in the database using the set of terms. The data structures in the database can be accessed and analyzed.

18 Claims, 25 Drawing Sheets

U.S. PATENT DOCUMENTS

| | | | |
|---|---|---|---|
| 5,131,039 | 7/1992 | Chaum | 380/23 |
| 5,202,921 | 4/1993 | Herzberg et al. | 380/23 |
| 5,239,617 | 8/1993 | Gardner et al. | 395/12 |
| 5,283,731 | 2/1994 | Lalonde et al. | 364/401 |
| 5,299,125 | 3/1994 | Baker et al. | 364/419.08 |
| 5,317,677 | 5/1994 | Dolan et al. | 395/77 |
| 5,319,542 | 6/1994 | King, Jr. et al. | 705/27 |
| 5,321,620 | 6/1994 | Tanaka et al. | 364/468 |
| 5,369,577 | 11/1994 | Kadashevich et al. | 364/419.13 |
| 5,379,420 | 1/1995 | Ullner | 395/600 |
| 5,390,281 | 2/1995 | Luciw et al. | 395/12 |
| 5,414,838 | 5/1995 | Kolton et al. | 395/600 |
| 5,434,777 | 7/1995 | Luciw | 364/419.13 |
| 5,440,634 | 8/1995 | Jones et al. | 380/24 |
| 5,444,823 | 8/1995 | Nguyen | 395/51 |
| 5,473,732 | 12/1995 | Chang | 395/77 |
| 5,557,518 | 9/1996 | Rosen | 364/408 |
| 5,603,031 * | 2/1997 | White et al. | 709/303 |
| 5,664,115 | 9/1997 | Fraser | 705/37 |
| 5,717,923 * | 2/1998 | Dedrick | 707/102 |
| 5,794,210 * | 8/1998 | Goldhaber et al. | 705/14 |
| 5,799,284 * | 8/1998 | Bourquin | 705/26 |
| 5,809,317 * | 9/1998 | Kogan et al. | 395/762 |
| 5,812,134 * | 9/1998 | Pooser et al. | 345/356 |
| 5,812,135 * | 9/1998 | Kotchey | 345/356 |
| 5,937,163 * | 8/1999 | Lee et al. | 709/218 |

OTHER PUBLICATIONS

Chaum, D. "Security Without Identification: Card Computers to make Big Brother Obsolete", Communications of the ACM, vol. 28, pp. 1030–1044, Oct. 1985, copy supplied printed from world wide web site "http://digicash.support.nl/publish/bigbro.html" on Apr. 3, 1997 (24 pages).

International Preliminary Examination Report dated Jan. 13, 1998 (PCT/US97/01057, filed Jan. 17, 1997), 6 pages.

* cited by examiner

SYSTEM AND METHOD FOR STORING AND SEARCHING BUY AND SELL INFORMATION OF A MARKETPLACE

1. RELATED APPLICATIONS

The following applications are related to the invention and are hereby incorporated by reference:

"Intelligent Agents for Electronic Commerce," application Ser. No. 08/784,829, filed Jan. 17, 1997, U.S. Pat. No. 6,119,101 having inventor Douglas L. Peckover, and claiming priority from, "Intelligent Agents for Electronic Commerce," application Ser. No. 60/010,087, filed Jan. 17, 1996 pending, having inventor Douglas L. Peckover;

"Third Party Privacy System," application Ser. No. 60/050,411, filed Jun. 20, 1997 pending, having inventors Douglas L. Peckover and Jeffrey M. Zucker;

"Agent Technology for Newsgroups," application Ser. No. 60/047,341, filed May 21, 1997 pending, having inventors Carolyn Barthelenghi and Douglas L. Peckover;

"Ad Agent Method and Apparatus," application Ser. No. 60/052,373, filed Jul. 11, 1997 pending, having inventors Carolyn Barthelenghi and Douglas L. Peckover; and "Analysis and Communication Tools for a System," application Ser. No. 60/057,685, filed Aug. 27, 1997 pending, having inventor Douglas L. Peckover.

2. BACKGROUND OF THE INVENTION a. The Field of the Invention

This invention relates to the field of information searching and communications systems. In particular, the invention relates to a searching and communications system for electronic commerce.

b. Background Information

The Internet provides an infrastructure for efficient electronic commerce. With the multitude of possible consumer choices presented by the Internet and the World Wide Web (also referred to as the Web), new problems have arisen for consumers. One problem is that the Internet provides so much information that consumers have difficulties determining whether what the consumers want is available and what the various options may be. Search engines help consumers address this problem by indexing large portions of the information on the Internet. However, as described below, present search engines are limited in their capabilities. Another problem presented to consumers is that there is no simple way to describe the goods or services that a consumer wants to buy if those goods or services are not already being offered. Issues of privacy and security are also concerns for consumers. Another problem is that suppliers of goods and services cannot determine what to supply to consumers. Typically, suppliers must rely upon past purchasing patterns, demographics, and other marketing tools to determine what to supply to consumers. These types of historical analyses are imprecise and result in inadequate service to consumers. The above problems are now discussed in greater detail.

Many different types of search engines are presently available. Keyword and hierarchical search engines are two examples of search engine types. For example, Excite provides a keyword search engine for searching for information on the Web. Excite relies on a number of server computers running programs that index addresses to Web pages. The indices are also associated with brief descriptions of those pages. A consumer can request a keyword search for web sites that may offer products or services of interest to that consumer. One problem with attempting to use such keyword searches is that the search engines find too much information. For example, on Jun. 6, 1997, entering the term "running shoes" produced the following number of Web sites hit on the following search engines:

| Search Engine Name | Number of Web Sites |
| --- | --- |
| Lycos | 19,943 |
| Excite | 755,705 |
| Infoseek | 919,639 |

The above results demonstrate a problem with keyword searching. The number of web site hits makes it very difficult to find the desired information. Often, the search results direct the consumer to a home page, or a first screen, of a Web site reference. The Web site then requires the consumer to navigate from the home page to the appropriate page corresponding to the desires of the consumer. Additionally the search engines make no attempt to understand the nature of the consumer's request. For example, there is no distinction made between an article containing the words "running shoes" and a merchant trying to sell "running shoes". Also, the order in which the Web sites are presented to the consumer is determined by formulas that are different for each search engine. The formulas can use keyword count, keyword location and advertising dollars spent by the owners of Web pages. Another type of search engine is a hierarchical search engine. For example, on Jun. 6, 1997, a search of the term "running shoes" in the Yahoo hierarchical search engine returned only twenty-four web site hits. Even though the hierarchical search engine helps the consumer traverse through some selections, the hierarchical search engine still does not provide the most desirable solutions for the consumer. There were probably far more than twenty-four web sites offering running shoes for sale. When a consumer selects one of the sites, the consumer is still taken to the front page of the Web site and left to search from that point on. Also, the order of the Web sites presented to the consumer is determined by hierarchical definitions defined by the search engine and not based on the searching preferences of the consumer. For example, the following is a sample from the results of the Yahoo search. This example combines the low number of sites in a hierarchical search with the poor relevance of a keyword search.

Business and Economy: Companies: Sports: Running: Shoes

World Wide Running—offers a wide selection of quality running shoes and accessories. Tortoise and Hare Running and Fitness Center—where runners run the store.

College Street Sports—Running shoes and clothes, cheerleading, Auburn University merchandise.

Runners Edge Athletics—running shoes and athletic clothing. Free shipping available.

Urban Athlete, The—road runners, running, cross training, jogging, track shoes.

Aardvark Sports Shop—running specialty store with a huge selection of running shoes, clothing & accessories located in Bethlehem, Pennsylvania.

Runners Roost—running shoes, with free delivery in the U.S.

Thus, what is desired is an improved search engine that helps consumers find the goods and services they want.

As mentioned above, one problem with Internet commerce is security and privacy. Presently, it is difficult not only to find the goods or services that are desired, but also to protect a consumer's identity and credit card information. Thus, it is desirable to have an integrated search and communication system that allows consumers to make purchases and express their needs for particular goods and services without compromising their identity and/or security.

As previously mentioned, another problem with present electronic commerce on the Internet is that there has been little improvement in providing consumers with products and services that they most desire. This is because tools have not been integrated into the searching and ordering process. Therefore it is desirable to be able to integrate the searching and ordering process to provide better insight into the true desires, preferences and priorities of consumers. This will allow suppliers to better provide goods and services that are desired by consumers.

Generally, what is desired is an improved search technique for consumers to express their desire for particular goods and services and to integrate those features with an improved communication system for supporting electronic commerce.

3. A SUMMARY OF THE INVENTION

An integrated search and communication system is described.

A method of accessing a database using a computer system. One example of the method includes the following steps. Access a tree data structure. The tree data structure includes a set of nodes linked in parent, child and sibling relations. Each node of a subset of nodes is associated with a corresponding term. Select some nodes of the set of nodes. This includes selecting a node of the set of nodes. The node has at least a sibling node. In response to selecting the node, performing one of the following actions. If the node is a first type of node, allowing a selection of the sibling node. If the node is a second type of node, not allowing a selection of the sibling node. Record a list of node selections corresponding to the selection of some nodes. Extract a set of terms from the list of node selections. Create a data structure including price information and duration of existence information. Store the data structure in the database using the set of terms. The data structures in the database can be accessed and analyzed.

Although many details have been included in the description and the figures, the invention is defined by the scope of the claims. Only limitations found in those claims apply to the invention.

4. A BRIEF DESCRIPTION OF THE DRAWINGS

The figures illustrate the invention by way of example, and not limitation. Like references indicate similar elements.

Figure 1:
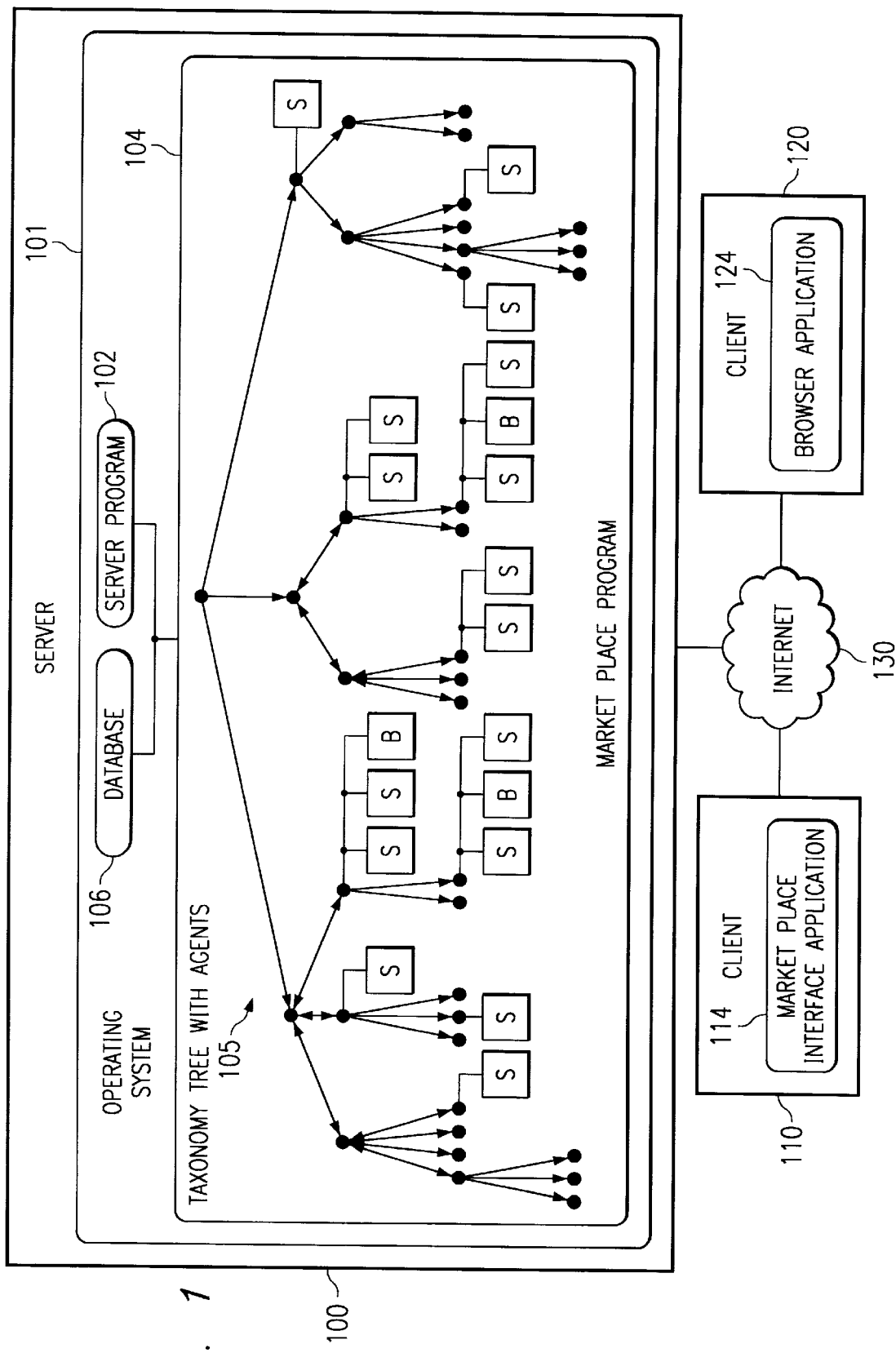
FIG. 1 illustrates an integrated searching and communications system.

5. THE DESCRIPTION a. An Overview of Some Embodiments of the Invention

One embodiment of the system includes a computer system running a number of programs. The computer system supports the search and retrieval of information about products and services being offered for sale and being requested. Each user connects to the computer system and is associated with at least one agent. An agent is a program and/or data structure that keeps information about any purchase and sale interests of the user, and/or takes initiative on behalf of the user. The agent may exist longer than the connection by the user to the system. To identify what the user wants to buy or sell or learn about, the system supports a modified tree search technique. The user follows branches of a tree, each branch further defining the interests of the user. Some nodes of the tree have multiple branches where any number of the branches can be selected by the user. The computer system further keeps track of the paths taken by users through the tree to help understand the importance of various options to users. This information lets other users better understand what products and services are desired and should be offered.

In some embodiments, a user can request that the agent be associated with a particular set of nodes and wait until a corresponding agent from some other user arrives at that node. For example, one user could leave a buy agent for two weeks associated with the path Universe:Automobiles:Autos Nationality:American:Pontiac:Sunbird:Air bags:Driver. This buy agent would wait for up to two weeks until a sell agent is placed having a similar path. When a sell agent is placed in a path having the same keywords as the path of buy agent, the buy agent will notify the consumer who placed the buy agent.

Importantly, the same path need not be followed by the user placing a sell agent as the user placing the buy agent. Thus, one embodiment of the invention allows users to traverse the tree in different ways and does not force them into a restrictive predefined tree search structure. Also, because multiple paths can be defined for the same information of interest, the various paths can be used to analyze the decisions being made by users. For example, marketing strategies or new products for particular market segments can be developed.

In some embodiments, during a search, a user can request to see all agents below a certain point in the path. All the agents associated with a similar path can be displayed. This information can be used, for example, by the user to determine whether that user has sufficiently specified his or her interests.

b. Terminology

The following terminology will be helpful in understanding various embodiments of the invention.

A product can be either a good or a service.

A consumer, or buyer, is any person or company that purchases products, or would otherwise be interested in receiving information about a product.

A supplier, or seller, is any person or company that supplies products, or would otherwise be interested in receiving consumer needs' information about products.

A user is a person or company that accesses the system. The user can be a consumer, buyer, supplier, or seller.

c. System View

FIG. 1 illustrates one embodiment of a system for searching and supporting communications. Product and services sellers and buyers can use the system to identify products and services of interest. The system retains the decision information for later analysis. The following paragraphs first list the elements in FIG. 1, describe the elements individually, and then describe the system's operation.

The following lists the elements in FIG. 1. FIG. 1 includes, a server 100, a client 110, a client 120, and the Internet 130. The server 100 includes the following elements: an operating system 101, a server program 102, a market place program 104, and a database 106. The market place program 104 includes a taxonomy tree with agents 105. The client 110 includes a market place interface application 114. The client 120 includes a browser application 124.

The following paragraphs describe the elements of FIG. 1 and their relationships to each other.

The server 100, the client 110, and the client 120 represent computer systems that can be used to access the Internet 130. Various embodiments of the invention include such computer systems as IBM PC compatible computers, Apple compatible computers, Sun Microsystems, Inc. workstations, network computers, and the like. These computers can run various operating systems like operating system 101. These operating systems can include Windows NT™, Windows 95™, the MacOS™, Unix, and Windows CE™. The operating system 101 allows for the execution of other programs on the server 100. Similar operating systems allow for the execution of the market place interface application 114 on the client 110 and the browser application 124 on the client 120. Any type of computer could be used, the above listed computers are merely examples.

The server program 102 provides connectivity to the Internet 130. The server program 102 can be, in various embodiments, a Windows NT™ Internet server, an Apache™ Web server from Cheyenne Software, a server from Netscape Communications, Inc., or a Novel web server. However, what is important is the market place program 104 can communicate with the user via computers, or order communication media for personal notification.

The market place program 104 enables users to search for products important to those users and communicate users' needs for those products. The market place program 104 also allows suppliers of products to analyze the needs of consumers. In one embodiment, the market place program 104 includes an object oriented application where each structure in the market place program 104 is an object. Other embodiments have other implementations such as combinations of structured language programs, SQL query engines, and object oriented programs.

The database 106 represents a repository for information in the taxonomy tree with agents 105, information about users of the market place program 104, and historical information about the use of the market place program 104. In various embodiments, the database 106 includes the GemStone™ database, from GemStone Systems Inc., an Oracle database, the Microsoft Access database, and/or an Informix database. What is important is that there is some place to store the information needed by the market place program 104.

The browser application 124 represents a Web browser. The browser application 124 connects through the Internet 130 and the server program 102 to the market place program 104. The browser application 124 represents the Netscape Communications, Inc. Netscape Navigator™, the Internet Explorer™ from Microsoft Corporation, or any other application that will allow connection to other Web servers and display information from those servers.

The market place interface application 114 is a stand alone application that allows the user at client 110 to connect to the market place program 104. The market place interface application 114 can be a Java application which will provide dedicated user interface features and connectivity features for the market place program 104.

What is important about the browser application 124, and the market place interface application 114, is that the users can connect to the server program 102 to access the market place program 104.

The taxonomy tree with agents 105 is a searchable tree from which users can locate and place agents that represent the need for or availability of products. The tree includes a number of nodes through which users can refine their definition of their needs. The agents represent programs and/or data structures that, among other features, allow the market place program 104 to maintain a history of a consumer's needs beyond the time in which the user is connected to the market place program 104.

Thus, the general system has been described. Before providing detailed examples of how the system is used, additional information about trees and agents is provided.

d. Tree and Agents

Trees allow a user to specify searches in very fine detail without necessarily requiring traditional hierarchical structures, keywords or query languages. Users traverse the tree node by node to refine their search. Each node can be a qualifier that further specifies what the user is searching for. Importantly, the tree can support multiple paths to the same definition of what a user is searching for.

Figure 2:
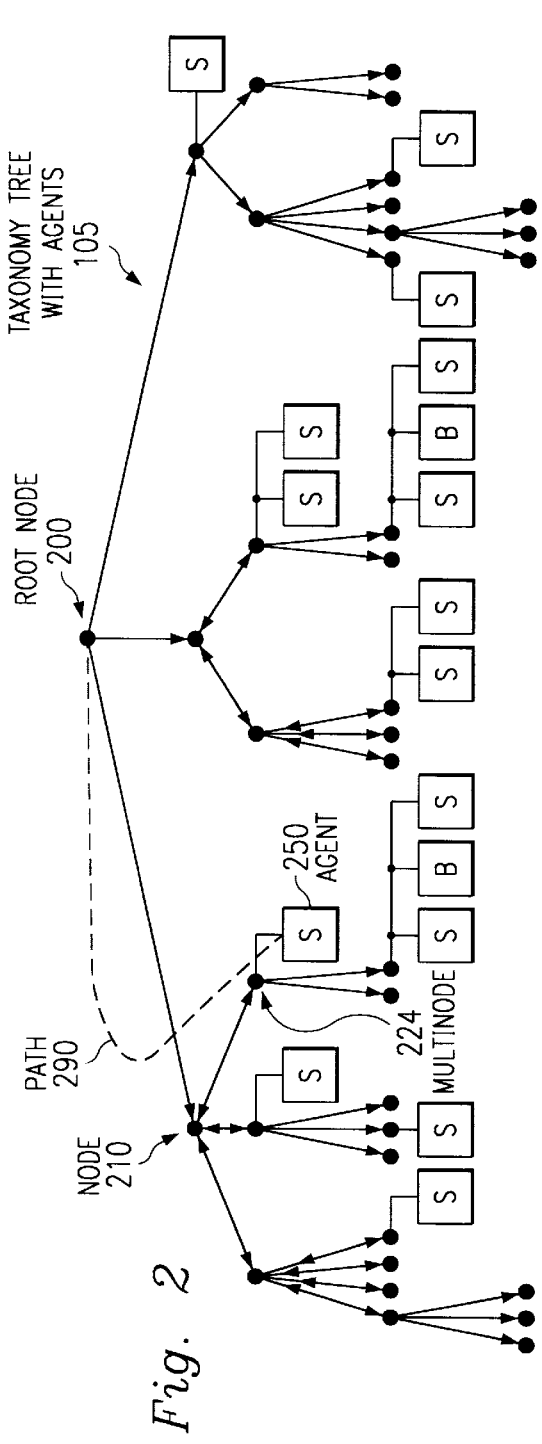
FIG. 2 through FIG. 4 illustrate the placement of three agents in a taxonomy tree.
Figure 3:
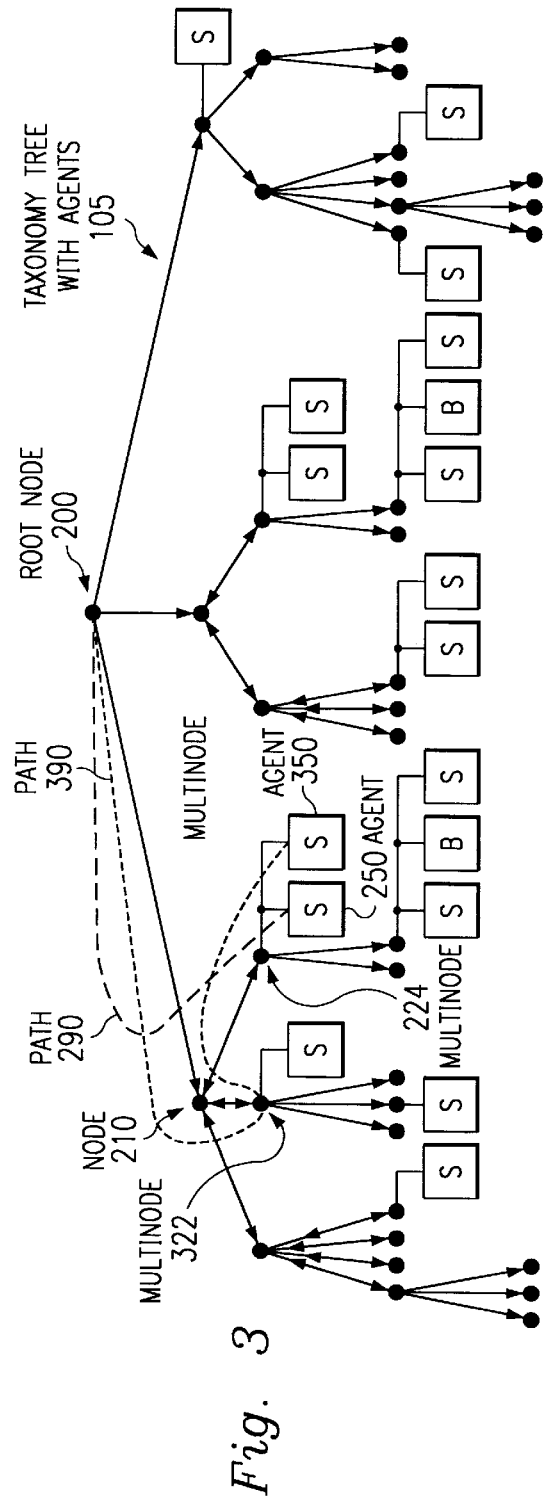
Figure 4:
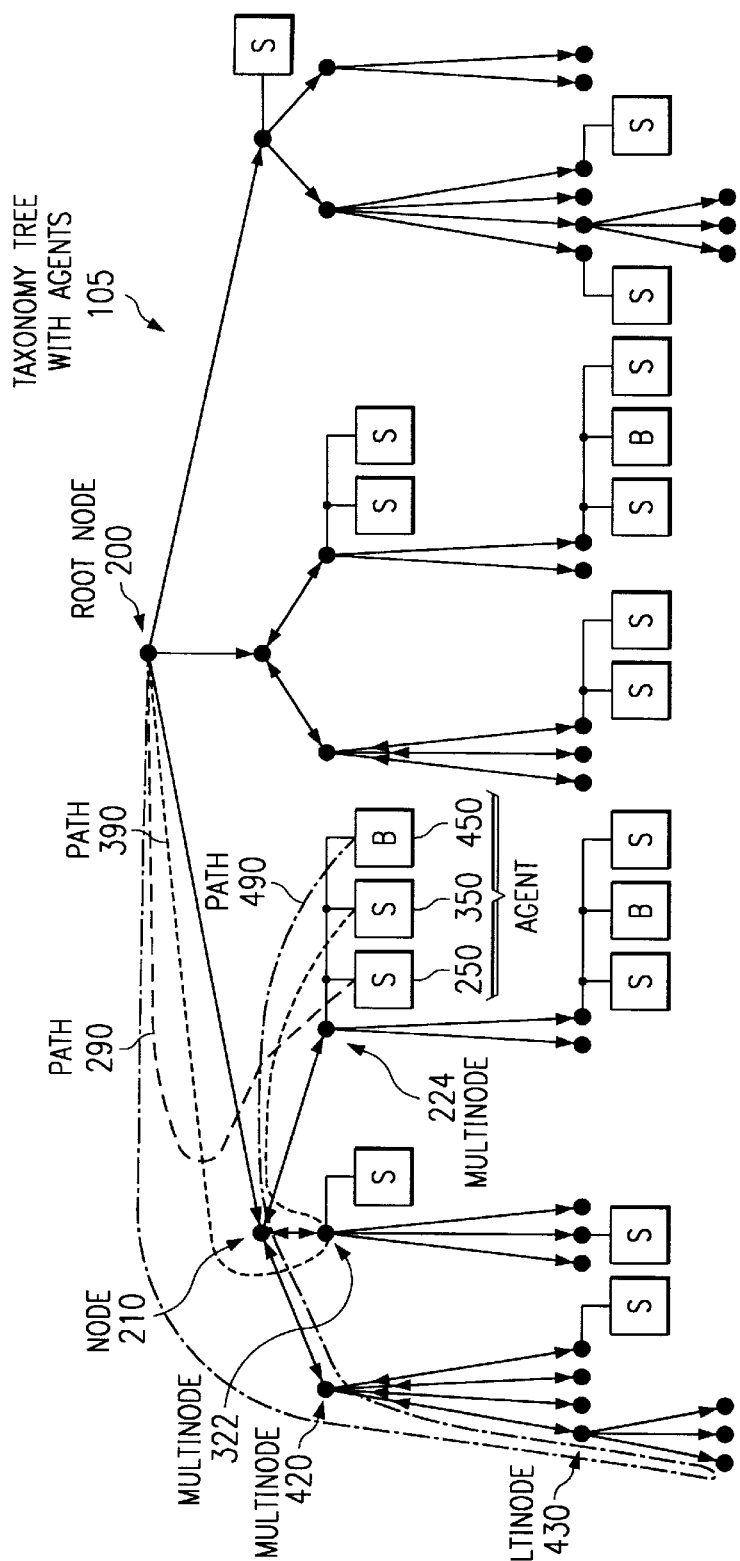

Allowing multiple paths to be used to define the same kinds of product or services information being sought allows different users to identify the same end product according to their own decision-making preferences and priorities. This feature supports multiple ways that users can think about accessing the information that they are interested in. FIG. 2 through FIG. 4 demonstrate this feature. These figures are described below.

The tree includes numbers of linked nodes. A node may have one or more child nodes and a parent node. However, in some embodiments, it is possible for a node to have more than one parent node, thus, the tree is shaped more like a directed graph.

A node in the tree can be associated with a key term (also referred to generally as a key, a key phrase, or a keyword). These key terms are used to index agents in the database 106.

The following describes an example node classification where the type of a node determines whether that node's siblings can be selected by a user. In this case, once a node of a particular type is selected, none of that node's sibling nodes can be selected. However, this describes only one type of tree, but the invention is not limited to this type of tree. For example, in one embodiment, the type of a node determines whether only one, or all of, the children of that node can be selected by a user.

In one embodiment, the tree includes three different types of nodes: an option node, a multinode, and a category node. The option node acts as follows. Given a set of child nodes of a parent node, if an option node is selected from that set, then no additional child nodes can be selected from that set. The multinode differs from the option node in the following way. If a multinode is selected from the set of child nodes, additional child nodes can also be selected (until an option node is selected). As will be shown below, the multinode supports multiple paths to defining information of interest. The category node differs from the option node and the multinode in that the category node does not operate as a key for storing and retrieving information (for example, a category node would not be used to retrieve an agent stored in the system). The category node allows the tree designer to group nodes under a node without causing that grouping node to be a key into the database 106. Note that in some embodiments of the invention, the function of the category nodes are performed by the option nodes and multinodes. In these embodiments, the option node, or multinode, indicates to the system whether that node should be used as a key for storing or retrieving information.

Each node in the tree can include the following references. A node can point to any other node in the tree (e.g., a parent or a child), supporting a path to that other node. A node can include one or more Web site references containing references to articles, products or services related to that node. A node in the tree can also be associated with comments, graphics or other information describing the node so that the user has the option of learning during the navigation process. A node can be associated with an intelligent agent that includes message ads or specific instructions to carry out a command or some other information on behalf of a person. This agent has the option of reporting any activity or lack of activity at that node back to the owner of the agent.

The order of selection of nodes in the tree represent the search path (also referred to as path) for the user. The search path can be used to derive keys for indexing agents. The keywords are derived from each node in the path (except for category nodes).

The combination of the three types of nodes allows the tree designer to specify a taxonomy that can be used by many different users. The various types of nodes can be nested so that multiple paths may be followed in identifying the information of interest to the user. The following is an example of a part of a tree. Indented node names indicate that those nodes are children of the nodes above.

Full/Part time (Multinode)
    Full-time (Option Node)
        Day shift (Multinode)
            Start at 7:00 am (Option Node)
            Start at 8:00 am (Option Node)
        Evening shift (Multinode)
        Night shift (Multinode)
    Part-time (Option Node)
        Hourly (Option Node)
        Daily (Option Node)
        Weekly (Option Node)
        Monthly (Option Node)

Within Full/Part time, the user has the option of selecting one of Full-time, or Part-time. Within Full-time, the user has the multiple choice of Day shift, Evening shift, and/or Night shift. Within Day shift, the user has the option of selecting one of Start at 7:00 AM or Start at 8:00 AM. If the user selects Part-time, then one of Hourly, Daily, Weekly, or Monthly can be selected.

As previously mentioned, the number of nodes in all of the possible navigational paths is very large (a factorial calculation). For example, a node with ten possible options would require over 3.5 million nodes to fully define all of the possibilities. All of these possibilities would have to be generated and stored. In order to reduce the storage space required for every possible node, parts of the tree can be dynamically generated as it is being navigated by the user. The following structure will be used as an example:

Experience (Multinode)
    JAVA (Multinode)
    C++(Multinode)
    HTML (Multinode)

Rather than set up the sixteen combinations of JAVA, C++, HTML (or no) experience, a table can be stored with three entries:

| | |
|---|---|
| Java | not used |
| C++ | not used |
| HTML | not used |

At this point, the navigation path is Experience and the three options are shown to the user. If the user selects HTML, the following would result:

| | |
|---|---|
| Java | not used |
| C++ | not used |
| HTML | used |

At this point, the navigation path would be Experience: HTML and the two options are shown to the user. If the user selects Java, the following would result:

| | |
|---|---|
| Java | used |
| C++ | not used |
| HTML | used |

At this point, the navigation path would be Experience-:HTML:Java and the remaining option (C++) would be the only option left.

In this example, the user is able to quickly navigate a Taxonomy.

The advantages are the elimination of:
The disk space to physically set up every combination of nodes,
The processing required to maintain the nodes, which could be complex when definitions change, and
The processing required to navigate these virtual nodes (as the table can be stored in RAM memory rather than disk memory because the table is so much smaller).

In one embodiment, the tree is stored as a file description of nodes. For each node, the file includes a key term and a number of flags. To build the tree, the file is read by the market place program 104 and each key term is used to create a node. The relative location of the node in the file is used to determine the node's links to other nodes. The flags determine the type of node and whether various operations can be associated with that node. For example, flags indicate to the market place program 104 the type of node, whether the node can have buy or sell agents associated with it, whether Web sites are included with the node, and whether additional information is associated with the node.

The above has describe the tree where the type of a node defines whether sibling nodes can also be selected, upon the selection of a given node. However, as mentioned above, in another embodiment, the type of the parent node can determine whether one or all of the child nodes can be selected by a user. In this case, if the parent node is an option node, then only one child node can be selected. If the parent node is a multinode, then one or more of the child nodes can be selected.

It is important to note that the person designing the taxonomy can also include special links between nodes in the tree. As described above, the links between the nodes are automatically set up when the tree is built. However, the person designing the taxonomy can be modify the automatically generated links. For example, in some embodiments, the person designing the taxonomy can break links between nodes to, for example, prevent the selection of some child nodes of a parent node when special child nodes are selected. Thus, this embodiment of the invention is very flexible.

Agents, as mentioned above, are data structures and/or programs that allow, for example, users to express their needs for products without having to maintain a permanent connection to the market place program 104. In one embodiment, the agents are stored in the database 106 and are indexed through a dictionary mechanism using the keywords associated with the nodes in the tree. The agents also keep their entire path for later searching, if desired. Agents can include all types of information and many examples are given throughout this specification.

There are many different types of agents that can be used in the market place program 104. The following describes buy agents, sell agents, navigation agents, and subscription agents.

A buy agent represents the desire of a user to buy a product. A sell agent represents the desire of a user to sell a product. Buy agents and sell agents can be indexed using the tree. The tree helps the user to express the desires for purchasing or selling the products. The buy and sell agents persist beyond the length of connection to the market place program 104 by the client.

A navigation agent is associated with each users connection to the market place program 104. The navigation agent allows the user to navigate through the taxonomy tree with agents 105. The navigation agent retrieves and/or generates and causes the display of all of the possible navigational paths available from a particular node in the tree for the user. This information is then displayed at the market place interface application 114, or the browser application 124. The navigation agent also displays, or otherwise presents, any comments, graphics, audio or other information at a particular node that the consumer is at that time. The navigation agent also allows the user to reverse the navigational path to correct any errors in navigating. The navigation agent also calculates and displays the navigational path taken to get to the current node in the tree. The navigational agents can optionally pass the navigational path to another server and/or log the navigational path and retain that for future connections by the user or other party. The navigational agent also allows the user to act upon a current node. This could include linking to any associated Web sites, placing a buy or sell agent, or performing a search for agents at the particular node in the path.

The navigational agent is associated with a description of a user. This allows multiple navigation agents to be used by a single consumer at the same time. The navigational agent can access preferences within the user's description, which is stored in database 106, that will help the navigational agent take shortcuts through the tree to preferred areas for the user. This preference information can be used by the market place program 104 to order the display of selectable nodes for a user.

In one embodiment, the navigation agent is an object in the market place program 104. The navigation agent's ID and state information is maintained in the URL for each client session. Thus, the navigation agent can distinguish between multiple client sessions using the same navigator. Thus, the user can maintain contact with the navigation agent. In some embodiments, the navigation agent expires after a period of inactivity at the navigation agent (e.g., after a predetermined period since the last connection to the navigation agent.)

Another type of agent is the subscription agent. The subscription agent can be used for generating and retrieving marketing information about the navigation agents, buy agents, and sell agents that are associated with some node, path, or set of keywords. Subscription agents are placed by suppliers or consumers who wish to know about this type of information. The subscription agent looks for certain types of events at a particular node, path or set of keywords, and then acts upon the occurrence of one of those events according to predefined rules. The rows of the following table illustrate examples of the types of subscription agents that can be placed on a node in a tree.

| User ID | Event to look for | Notify by | Priority |
| --- | --- | --- | --- |
| AS502 | Anyone navigating | log, e-mail weekly | low |
| DRE44 | New links added here | log, e-mail daily | low |
| BTTW | Buy Agent removed | e-mail immediately | high |

Events that could activate the subscription agents associated with a node include a user navigating through that node, a user linking to a web site from that node, a user acting on a buy or sell agent at this node, activity of another agent at this node, or the lack of any kind of activity at this node over a period of time. Other embodiments use other events to activate a subscription node.

Once activated, a subscription agent will operate according to the rules associated with that subscription agent. An example of a use of a subscription agent is placing a subscription agent on the same path as a buy agent. (Alternatively the subscription agent could be associated with the same set of keywords as the buy agent but be at a different node.) The subscription agents event would wait until the buy agent is removed. This event would be triggered when the buy agent stops looking for the product or service that is to be bought. This subscription agent could notify it's user when the buy agent is removed. The user could then place his own buy or sell agent at a different price than the agent that was removed.

As noted, the subscription agent has notification instructions but also includes priority instructions. For example, a subscription agent may first log its events into a file, then transmit them to an e-mail address, and then page the user if the user does not contact the subscription agent within a period of time. The priority of these actions is specified within the subscription agent.

e. Example of Tree Searching

FIG. 2 through FIG. 4 illustrate the placement of three agents in the taxonomy tree with agents 105. A user traverses the tree to refine the products needed by the consumer.

The tree in FIG. 2 includes a number of nodes and agents. The user starts at the root node 200 and is presented with three choices associated with the three child nodes of the root node 200. One of these child nodes is the option node 210.

In this example, the user selects the option node 210 to refine the search. An example of the child nodes under the root node 200 might be nodes associated with the key terms: automobiles, employment and real estate. Thus, in this example, the user selects the automobiles option node. Because node 210 is an option node, after the user selects the node 210, the other two child nodes under the root node 200 are not available for selection.

The user is then presented with the child nodes under the option node 210. In this example, the user selects the multinode 224. The user can still select the other nodes under the node 210 because multinode 224 allows such selections. However, in this example, the user places a sell agent 250 at the multinode 224. The sell agent 250 is associated with the path 290. The path 290 includes the root node 200, the node 210, and the multinode 224. Thus, the keywords used to index the agent 250 would be the words associated with the root node 200, the node 210, and the multinode 224.

FIG. 3 illustrates a user placing a second sell agent 350 in the taxonomy tree with agents 105. Again, the user starts at the root node 200. The user selects the option node 210 and then selects the multinode 322. Because multinode 322 is a multinode, the user can still select the other two child nodes under the node 210. In this example, the user selects the multinode 224. Thus, the path 390, associated with the sell agent 350, includes the root node 200, the node 210, the multinode 322, and the multinode 224. The agent 350 would therefore be associated with the corresponding keywords for the nodes in the path 390. Note that because there are no category nodes in the path 390, each node will be associated with a keyword for indexing the agent 350 into the database 106. Note also that even though the agent node 350 is placed at the same node as the agent 250, the path 390 is different. The path 390 has more refined information for the agent 350 than the path 290 has for the agent 250.

FIG. 4 illustrates a user placing a third agent 450 in the taxonomy tree with agents 105. In this case, the user traverses the path 490. The path 490 goes through the root node 200, the node 210, a multinode 420, a multinode 430, and a multinode 224.

At the end of the path 490, the user places the agent 450 as a buy agent. The buy agent 450 is looking for some product that is associated with the keywords in the path 490. It is important to note that if the agent 450 had been placed at multinode 430, but the user had followed the path through root node 200, root node 210, multinode 224, multinode 420, and multinode 430, the same set of keywords would be associated with the agent 450. Thus, the user would have defined the same set of information of interest by following a different path. That the same needs can be described using multiple paths illustrates the flexibility of the taxonomy tree with agents 105.

f. Example of Tree Searching and Use of Agents

Figure 5:
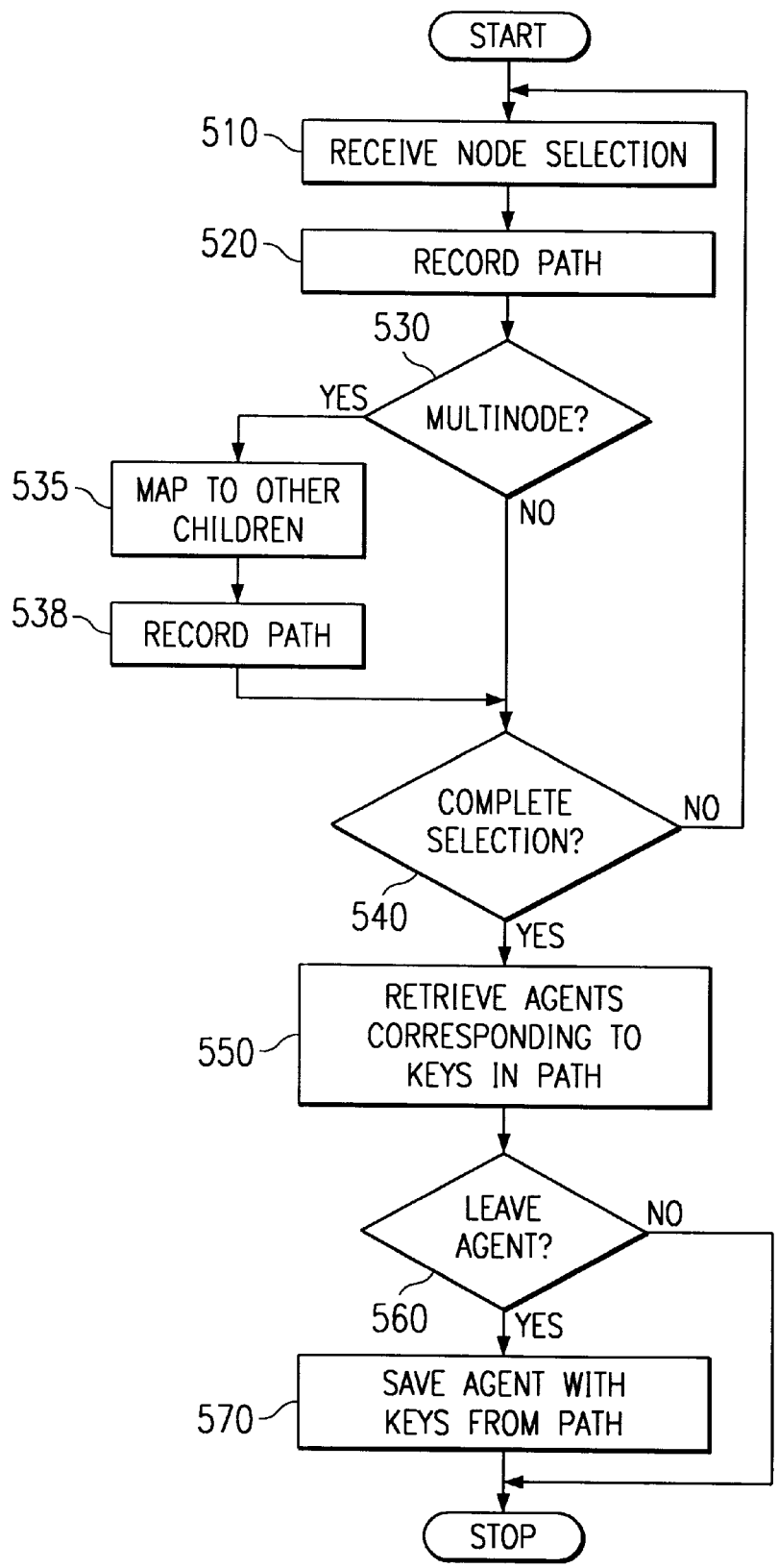
FIG. 5 illustrates an example of searching the tree and placing agents.

FIG. 5 illustrates an example of searching the tree and placing agents. This example can be performed using the system of FIG. 1. A user would use the client 110, or the client 120, to access the market place program 104 through a navigation agent.

At block 510, as directed by the navigation agent, the market place program 104 receives a selection of a node within the tree.

At block 520, the navigational agent records the path taken as a result of the selection of a node at block 510.

The navigational agent, in response to the selection of the node at block 510, must also determine what available nodes there are for further selection by the user. This requires determining whether the present node selected at block 510 is a multinode or not. At block 530, the navigational agent determines whether the selected node is a multinode. If the node is a multinode, then at block 535, the list of possible nodes for selection includes the other child nodes of the selected node's parent. This information is remembered by the navigational agent so that when any further selections under the present node are complete, the user will be allowed to select from the sibling nodes of the present node. This situation is illustrated in FIG. 4, in path 490. When the user selected the multinode 420, the navigational agent remembered that the multinode 322 and the multinode 224 could still be selected by the user. Once all of the selections were completed under the multinode 420, the navigational agent presented the multinode 322 and the multinode 224 as possible selections.

If the selected node is not a multinode, then the navigational agent simply presents any nodes under the selected node. This is illustrated in FIG. 4 where the user selected the option node 210. The user could select any additional nodes underneath that option node 210, but was no longer allowed to select other child nodes under the root node 200. Of course, the navigational agent allows the user to back track up the path, at which point the user could have selected a different node under the root node 200.

At block 540, a test is made to determine whether the user has indicated that all of the selections are complete. This can be performed by the user requesting that an agent be stored in the database and be associated with the present path. If the selection process is not complete, then block 510 through block 540 are executed. If the selection process is complete, then block 550 is executed.

At block 550, the user can indicate a request to retrieve all of the agents corresponding to the keywords in the present path. (This is just one example of a way of completing the selection process at block 540.) The navigational agent requests that the market place program 104 acts as the database 106 using the keys in the present path (stored at block 520).

In the example of FIG. 4, if the user has followed path 290, then agent 250, agent 350 and, agent 450 will all be retrieved by the execution of block 550. The navigational agent would then display this information to the user.

In this example, because the seller did not find what he or she was looking for specifically, at block 550, the seller then requests that the navigational agent leave a buy or sell agent at block 560. Assuming the seller wished to leave an agent, then at block 570, the navigational agent causes a buy or sell agent to be left. The buy or sell agent being left is associated with the path stored at step 520 and step 538 if applicable, with the keys in that path. In one embodiment, this is done by copying the path and key information from the navigational agent, into a newly created buy or sell agent. The buy or sell agent is then stored in the database 106, in a dictionary indexed with the keys in the path. The user can also specify a number of characteristics for that buy or sell agent. These are described in greater detail in the examples that follow.

FIG. 5 illustrates one example of how a user might use the market place program 104. Other users may simply traverse the tree, but not leave agents. Others may traverse the tree and only leave agents, but not examine other agents. Others still may traverse the tree looking at various agents but not leaving any new agents. The market place program 104, watches the various paths taken by the users in search of the information that they are particularly interested in. The paths store the order of nodes selected in the tree. This order information can then be analyzed to determine what factors are most important to users when deciding to buy products. This will allow suppliers to more accurately provide products that fulfill the needs of consumers.

g. Example of Placing Sell Agent

FIG. 6 through FIG. 20 illustrate an example of a user placing a sell agent in the tree with agents 105. These figures show the user interface for the browser application 124 on the client 120.

Figure 6:
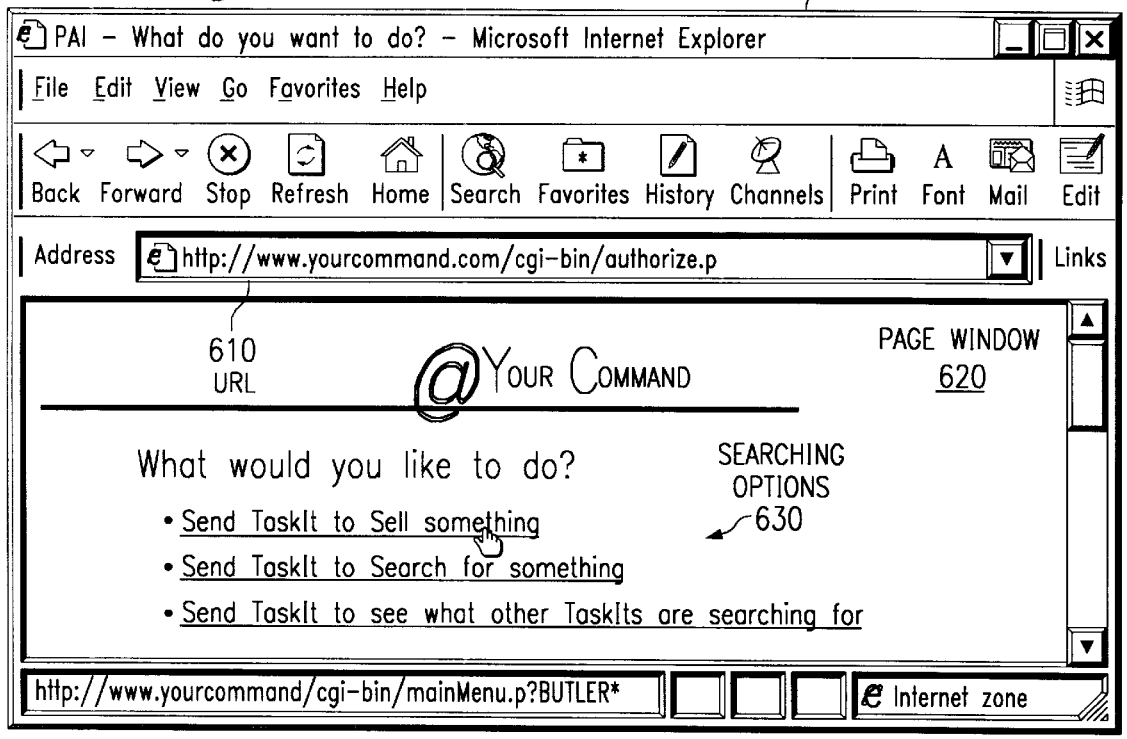
FIG. 6 through FIG. 20 illustrate an example of a user placing a sell agent in a tree.

FIG. 6 illustrates the basic example output of the browser application 124 (the Internet Explorer 4.0). FIG. 6 includes a browser window 600, the present URL 610, the page window 620, and a number of searching options 630 that a user may perform. The page window 620 presents the formatted HTML pages provided by the market place program 104. In this example, the HTML presents the searching options 630 for selection by the user. The user requests that a sell agent be placed in the tree by positioning the cursor over the send sell agent option.

Figure 7:
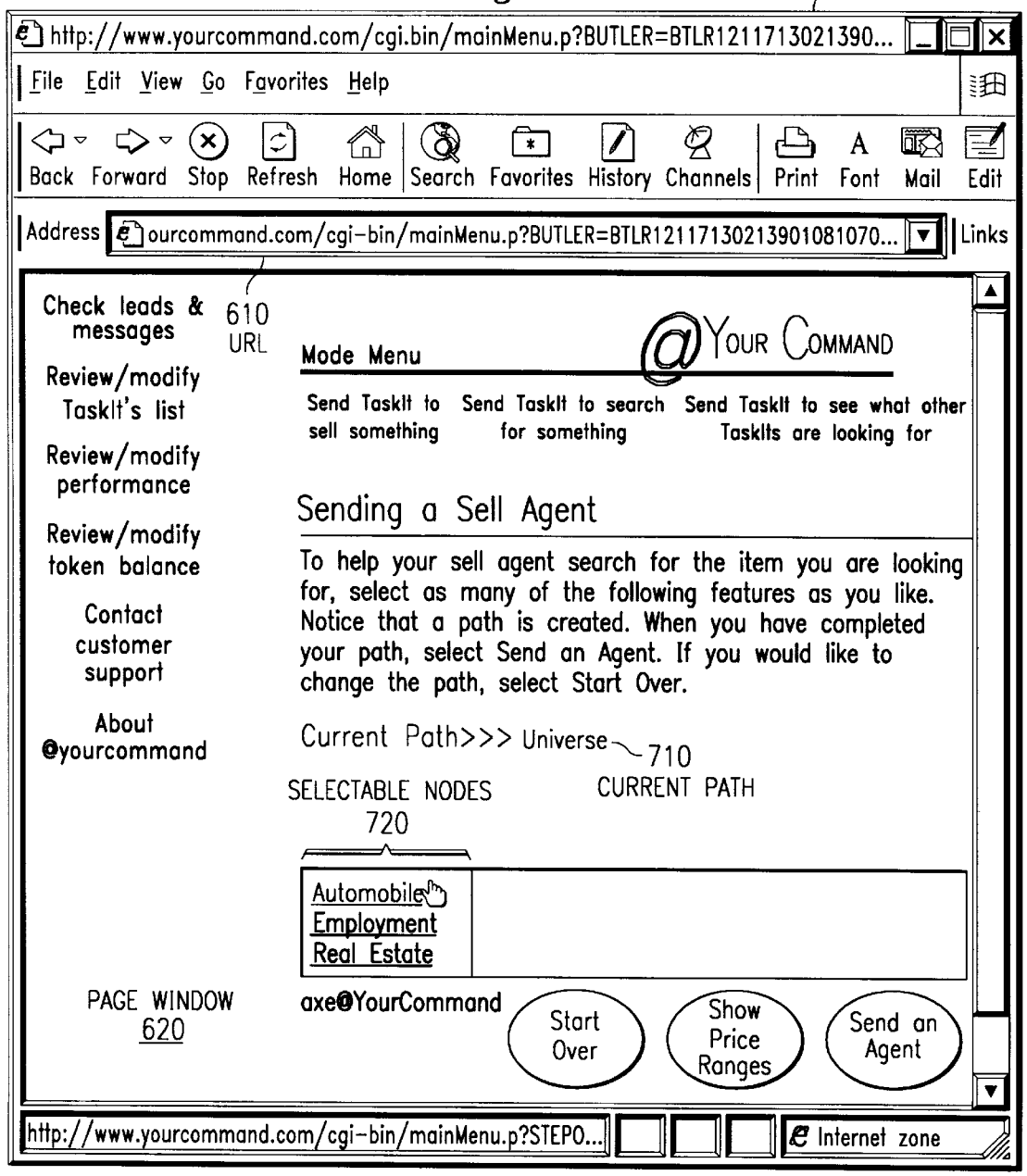

FIG. 7 illustrates the page for beginning the definition of the path for placing a sell agent in the tree. The page widow 620 illustrates the current path 710, and the selectable nodes 720 available under the current node in the current path 710. Returning to the example of FIG. 4, assuming that the root node 200 corresponds to the keyword Universe in the current path 710, then the node 210 would correspond to Automobiles, and the other two child nodes under the root node 200 would correspond to Employment and Real Estate. In this example the users wishes to place a sell agent for an automobile and selects the automobile link. Automobiles corresponds to an option node, like node 210 in FIG. 4.

The URL 610 includes the identity of the navigation agent. In this example, the navigation agent is identified as "BUTLER= BTLR121171302139010810707&BUTLERNAME=axe." The URL 610 also includes information about the path. This allows the market place program 104 to identify the navigation agent being used and the set of options that were presented to the user.

Note that in the following description, referring to the "Automobiles node" is an abbreviation for referring to a node associated with the term "Automobiles."

Figure 8:
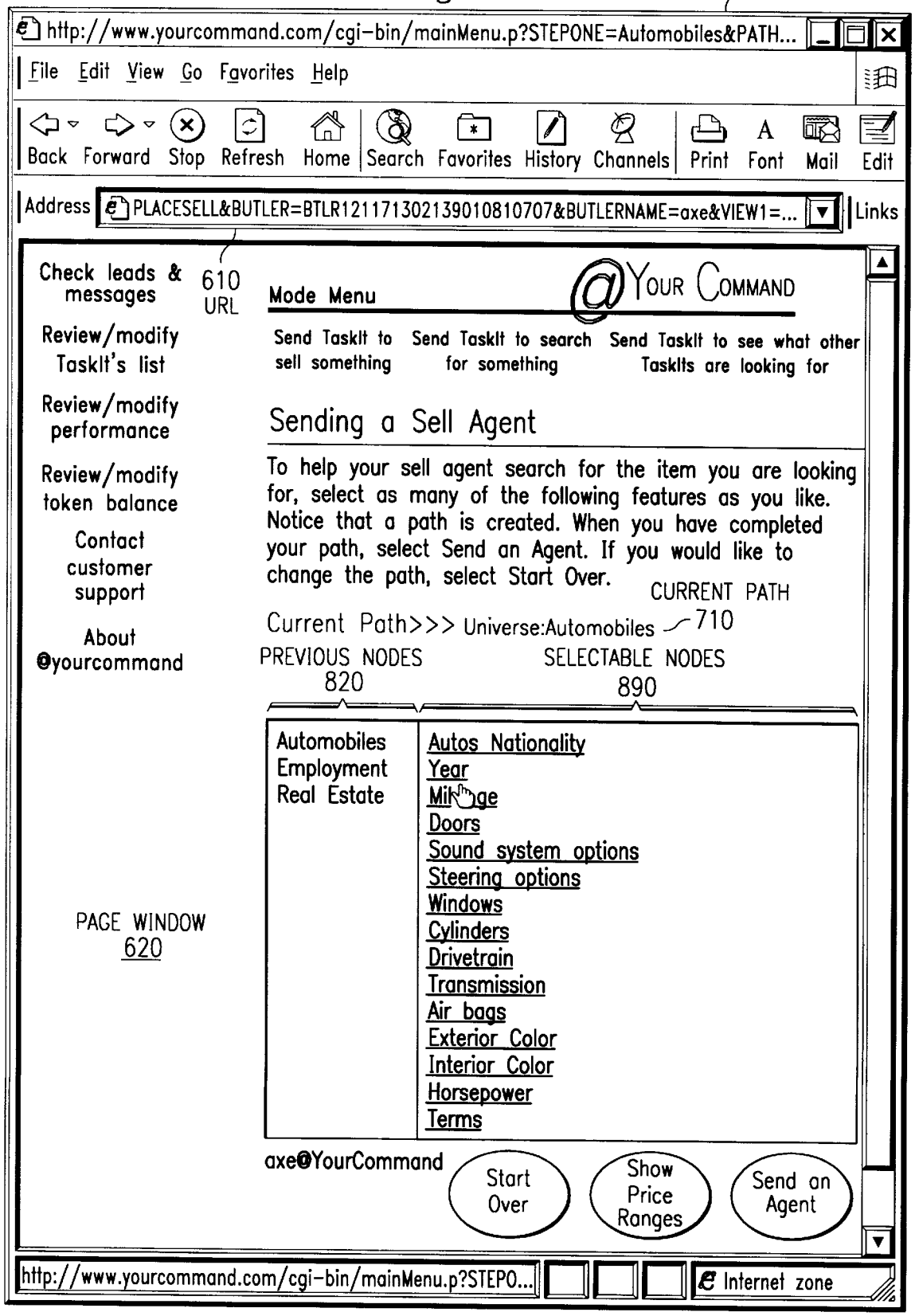

FIG. 8 illustrates the child nodes under the Automobiles node. The page window 610 shows the nodes available at the last selection and the selectable nodes 890. The selectable nodes 890 represent the nodes that can be selected that correspond to the current node in the tree. The current path 710 now includes Automobiles as a term.

In this example, the user selects the Year node, to specify the year of the vehicle that the user wishes to sell. The Year node is a multinode.

In one embodiment, the different types of nodes are shown in different colors, or using some other indicator. In another embodiment, category nodes are differentiated from non-category nodes through the use of indicators. Indicators can include font type, style, size, color, and the presence or absence of symbols, for example.

Figure 9:
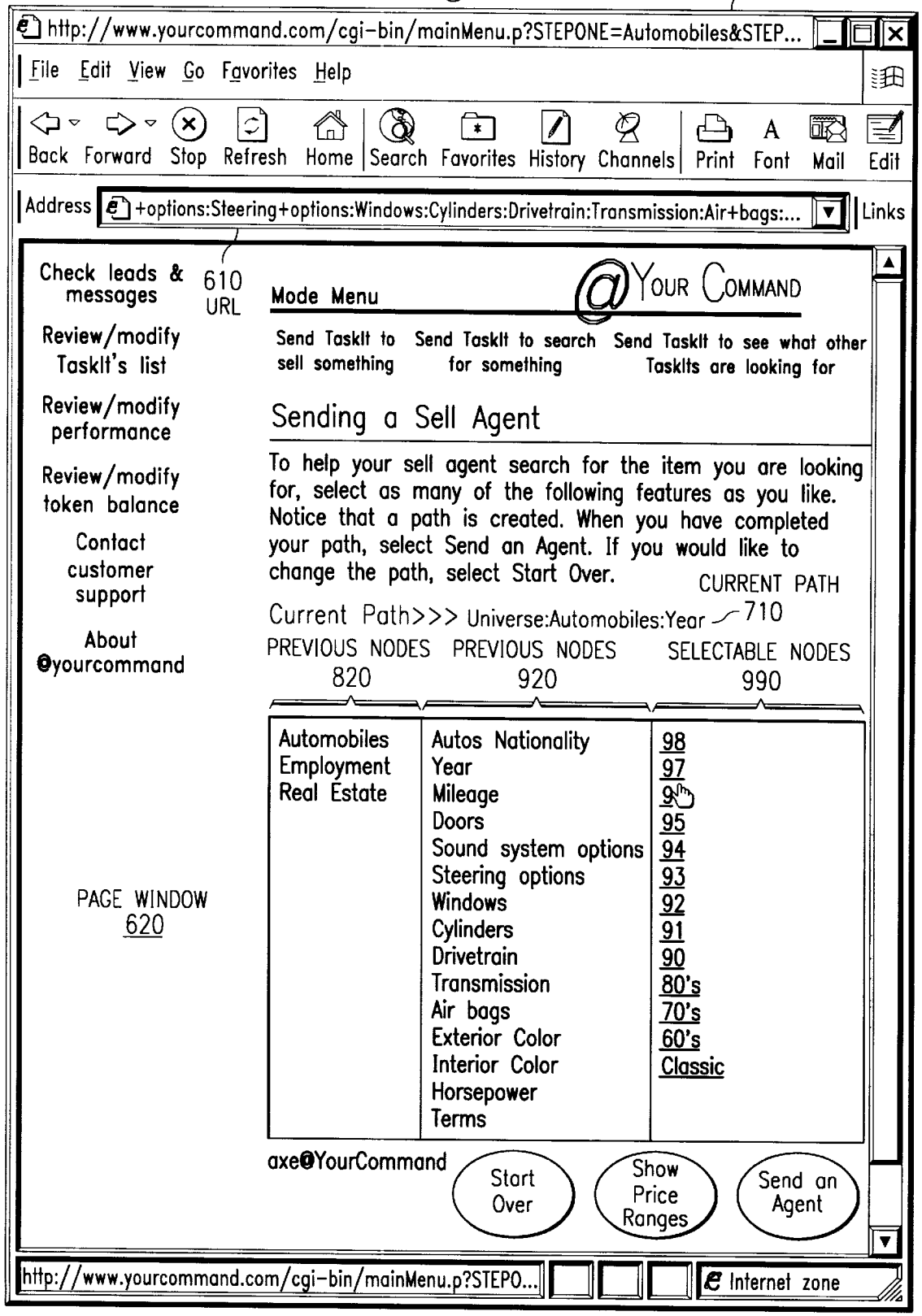

FIG. 9 illustrates the nodes available under the Year node. The previous nodes 910 illustrate the selectable nodes 890 of FIG. 8, while the previous nodes 820 are still displayed. By displaying these multiple sets of nodes, the system provides the user with context during a traversal of the tree. The current path 710 includes the node Year, representing the last node selection. Selectable nodes 990 include a number of years from which the user can select. In this example, the user selects the year 1997 node, which is an option node.

Figure 10:
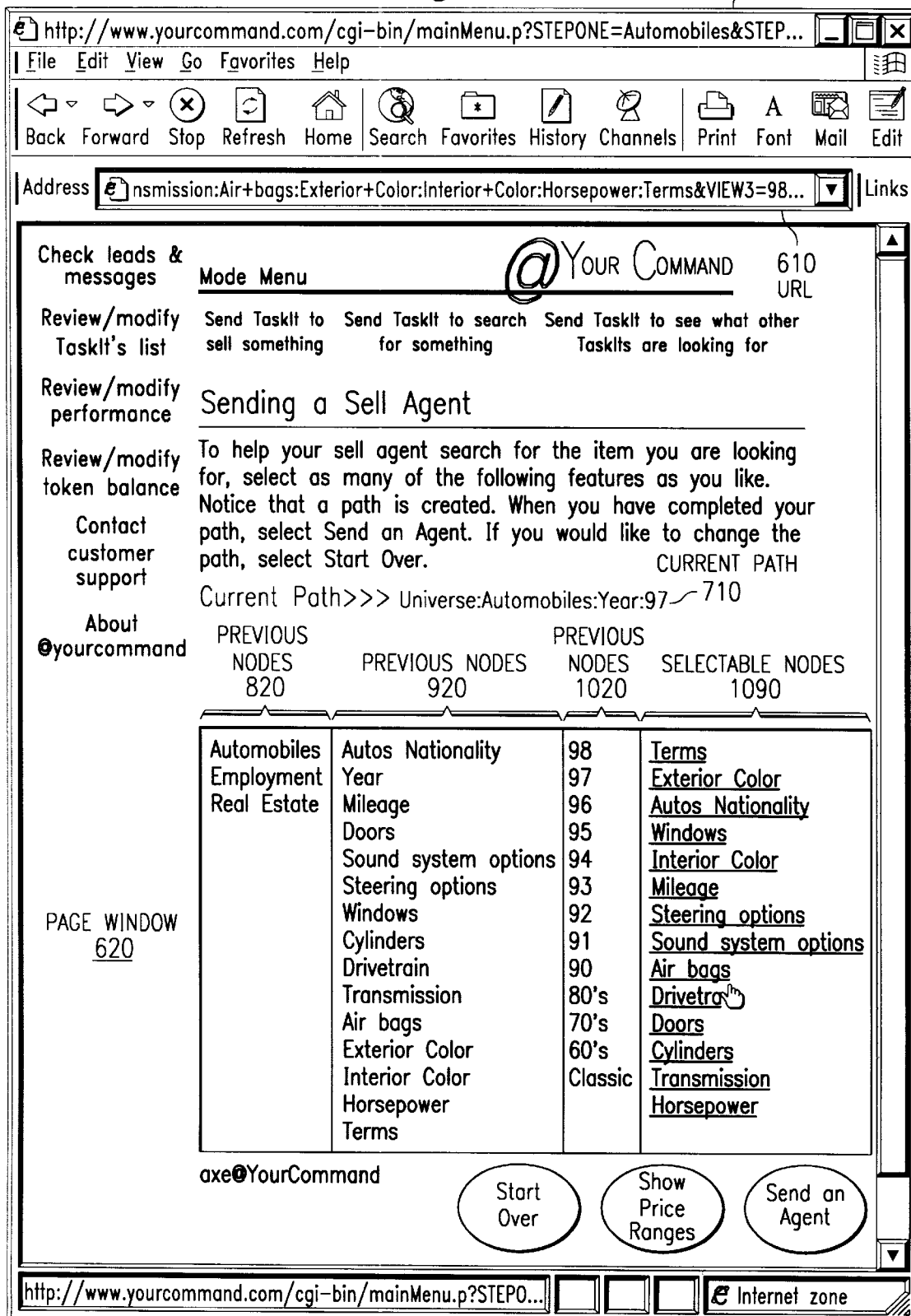

FIG. 10 illustrates the selectable nodes 1090, after the selection of the option node 1997. Because the Year node was a multinode, the other sibling nodes of the Year node are still selectable by the user. Thus, the selectable nodes 1090 are exactly the same as the set of previous nodes 920 except that the Year node is no longer selectable. The previous nodes 1020 show that 1997 was selected in the last selection. Note that the current path 710 now includes the term "97". The user now selects air bags from the selectable nodes 1090.

Figure 11:
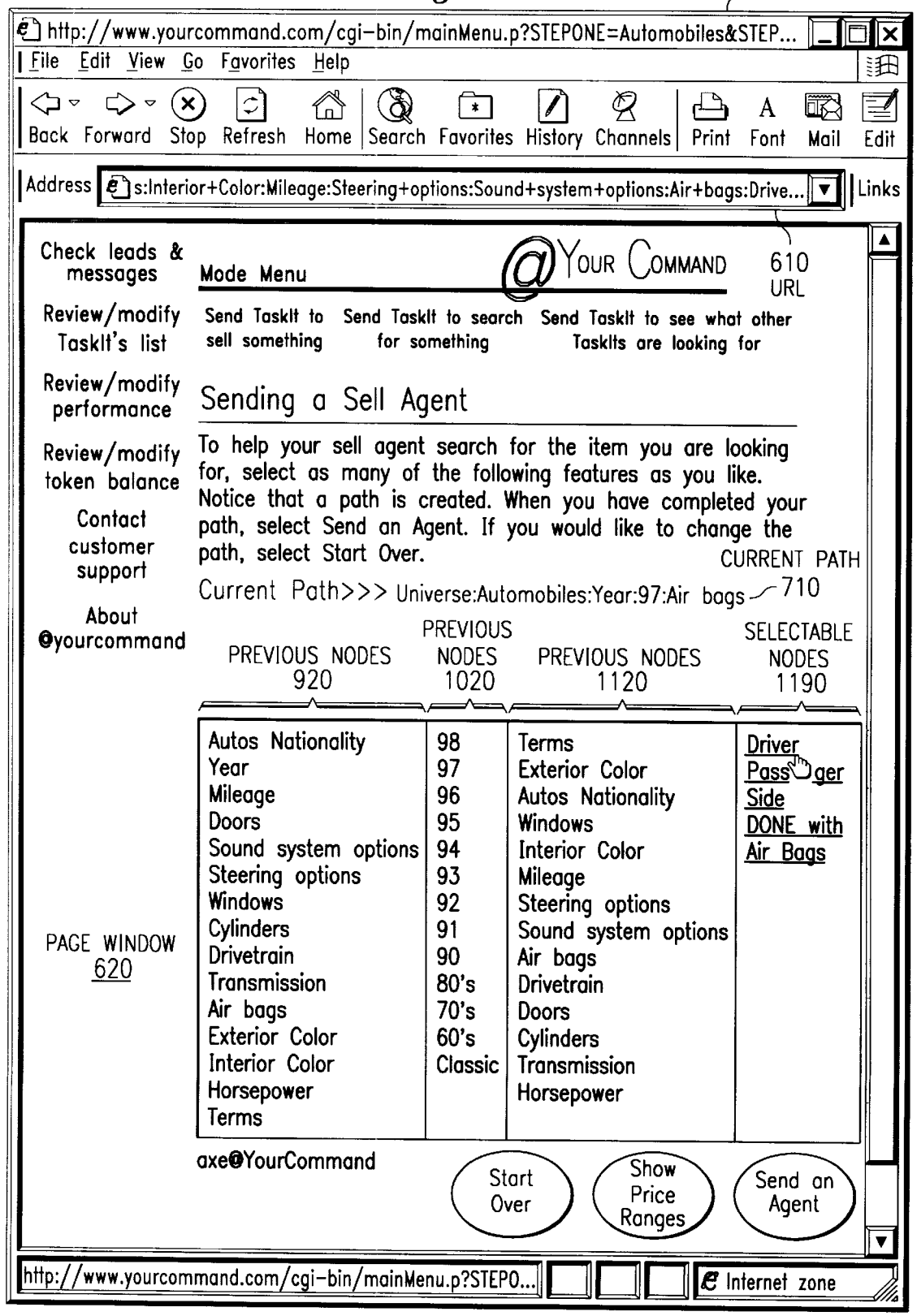

FIG. 11 illustrates that the selectable nodes 1190 include the four child nodes under the Air bags node. The previous nodes 1120 include all the nodes that were available under the selectable nodes 1090. Note that the previous nodes 820 are no longer viewable in the page window 620. However in other embodiments of the invention, more columns of nodes are presented in the page window 620. Still in other embodiments of the invention, fewer columns of previous nodes are presented. The number of columns presented can depend on the viewing area of the client 120 and the preferences of the user.

The current path 710 now includes the term Air bags. The previous nodes 1120 correspond to the selectable nodes 1090. At this point, the user selects the Driver node, which is a multinode.

Figure 12:
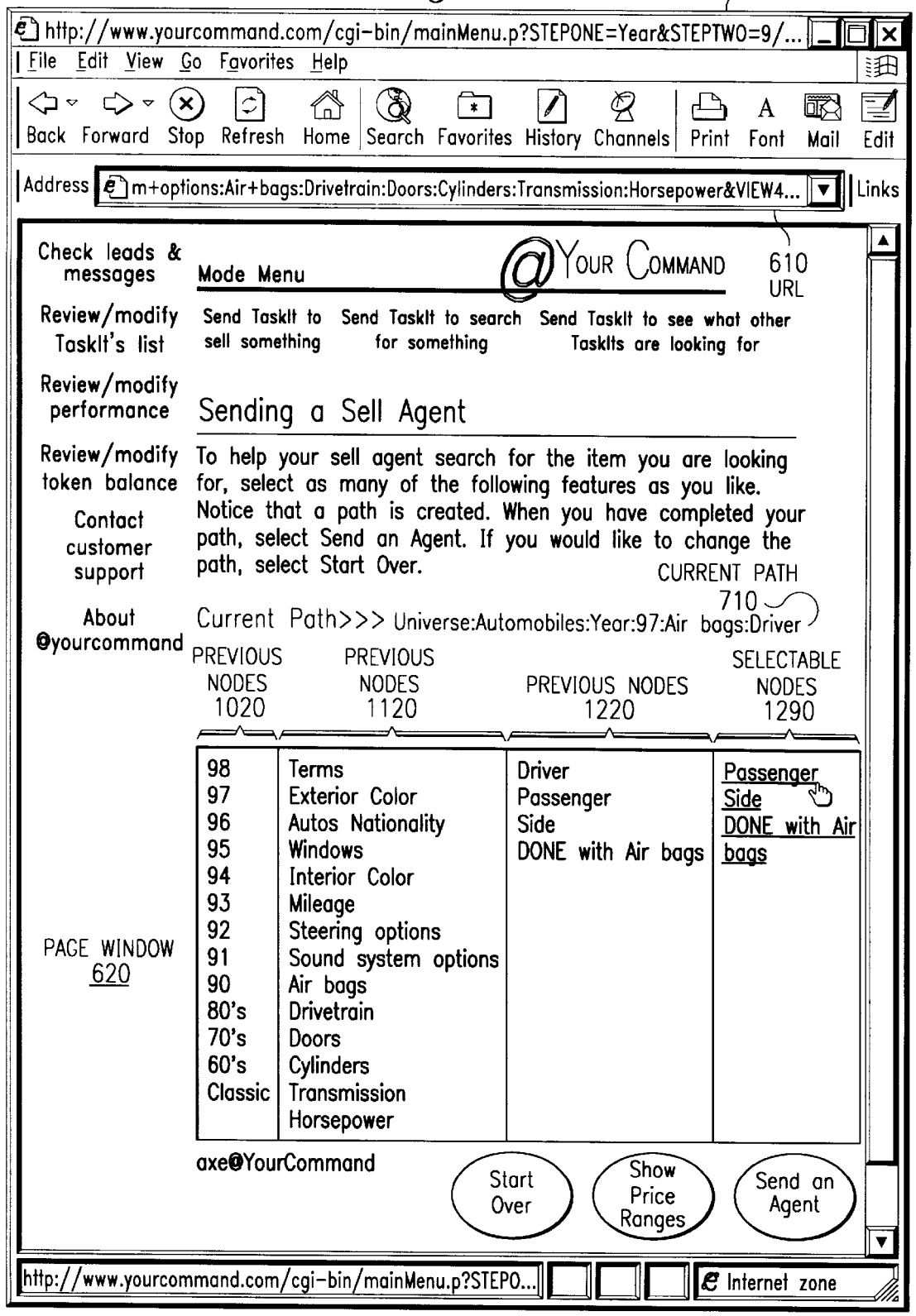

FIG. 12 illustrates the selectable nodes 1290. Because the Driver node is a multinode, the selectable nodes 1290 include the other sibling nodes of the Driver node. (The sibling nodes are shown in the previous nodes 1220. The sibling nodes include the Passenger node, the Side [impact] node, and the DONE with Air bags node.) The current path 710 has been updated to include the term Driver.

Figure 13:
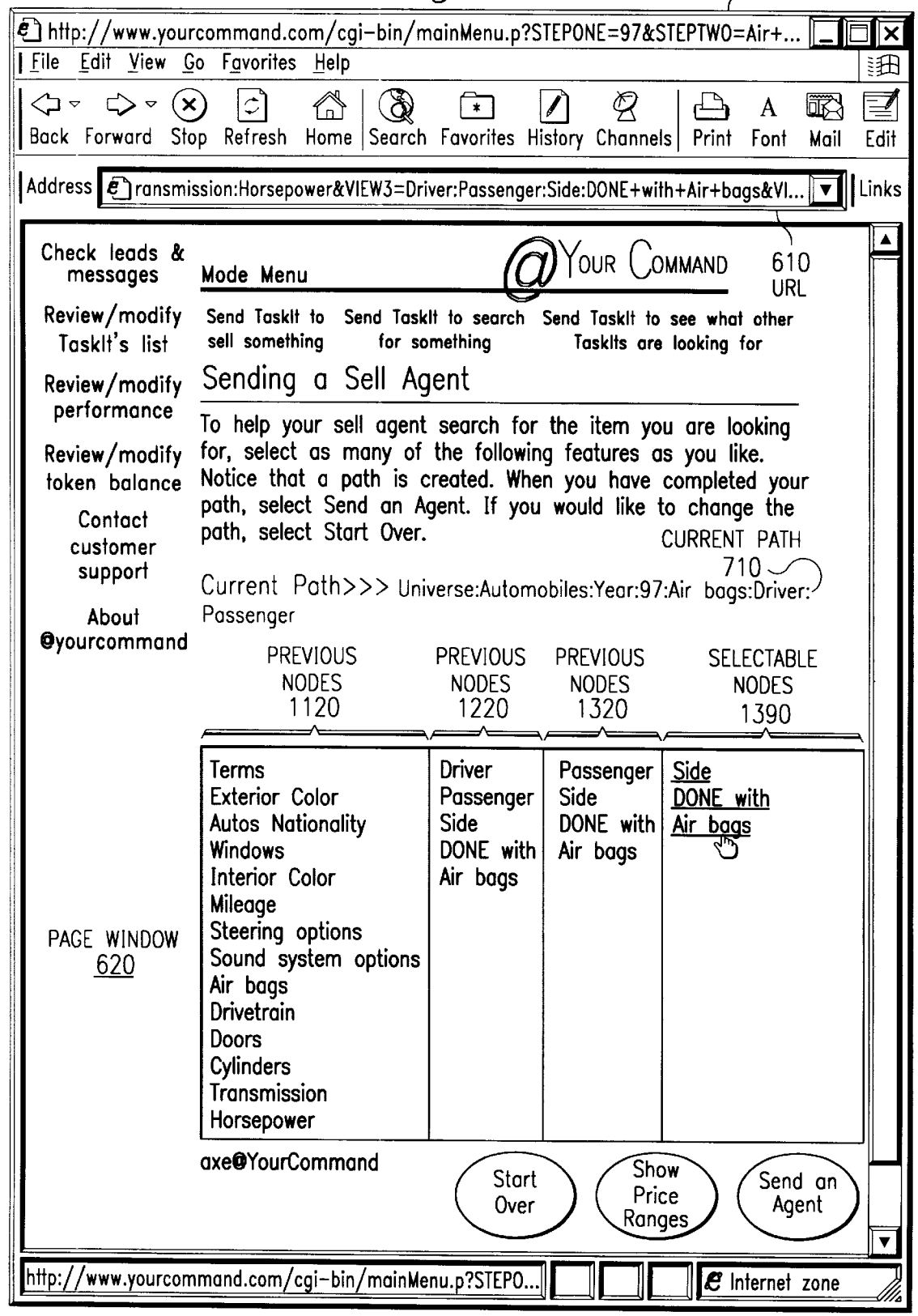

FIG. 13 indicates that the selectable nodes 1390 include the remaining siblings of the Passenger node. The current path 710 has been updated to include the term Passenger. The previous nodes 1320 correspond to the selectable nodes 1290. The user indicates that he or she is done identifying the air bags in the car the user has for sale. The user does this by selecting the node "DONE with Air bags." The DONE with Air bags node is an option node and prevents the further selection of any other child node under the air bags node.

Figure 14:
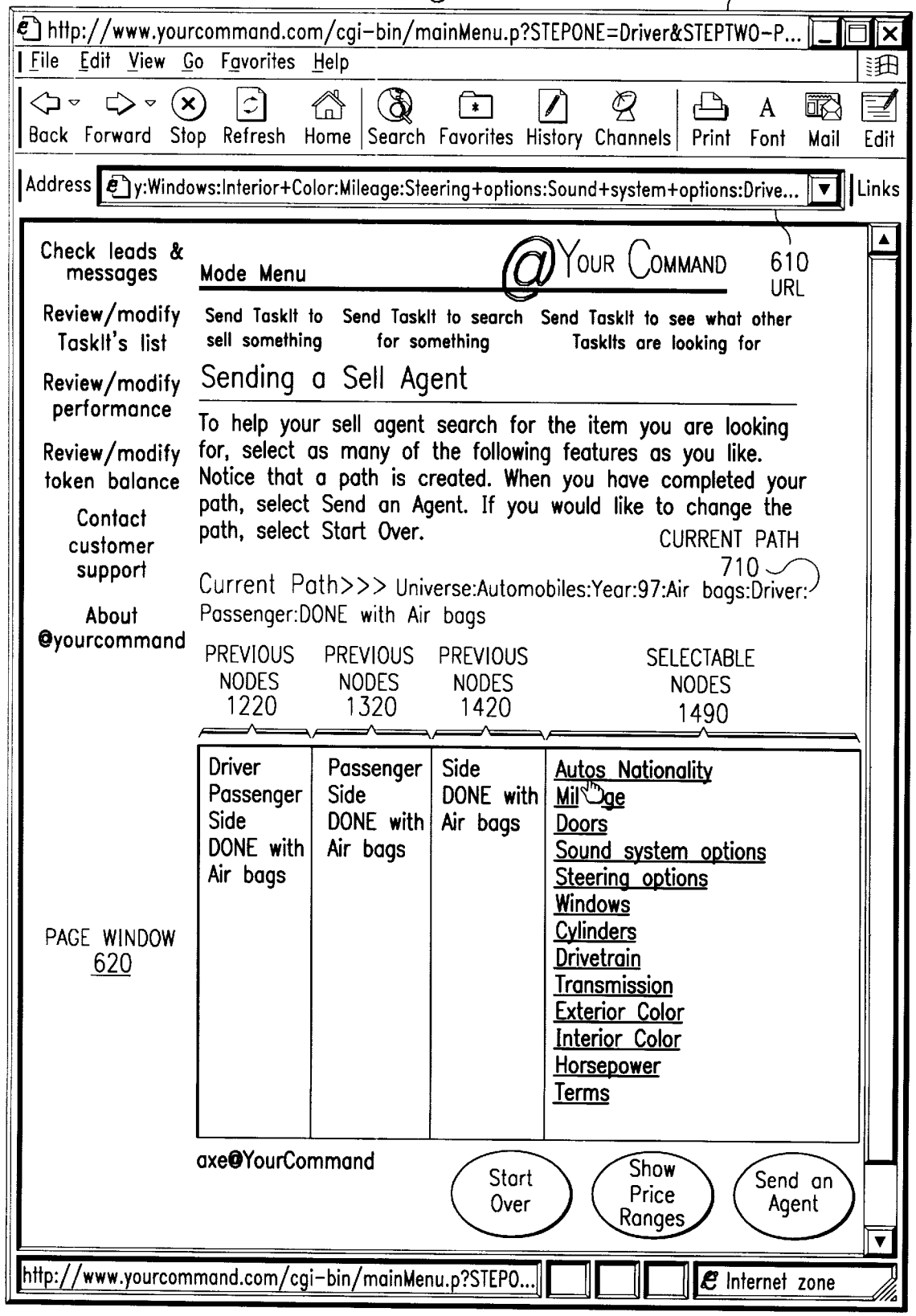

FIG. 14 illustrates that the selectable nodes 1490 correspond to the sibling nodes of the Ai r bags node. However, now that the Air bags and Year nodes have been s elected, the selectable nodes 1490 do not include these two nodes. The previous nodes 1420 illustrate that the DONE with Air bags node was an option node. The current path 710 has been updated to include "DONE with Air bags." The user selects Autos Nationality.

Figure 15:
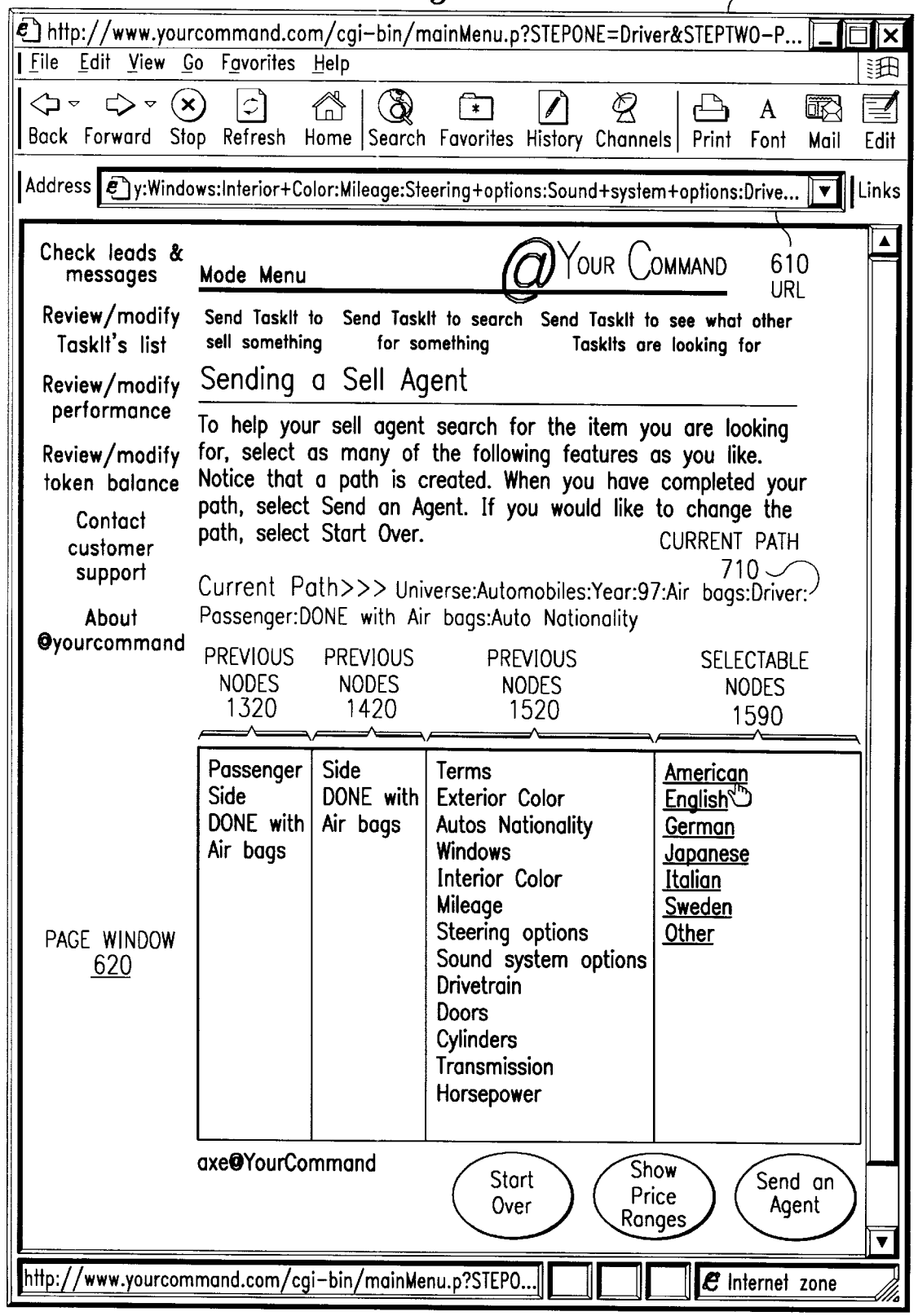

FIG. 15 illustrates the results of selecting the Autos Nationality node. The current path 710 has been updated accordingly. The selectable nodes 1590 include a number of nodes indicating the possible nationalities of the manufacturers of the automobiles. The user selects the American node.

Stepping back from the discussion of the search example, note the flexibility of the taxonomy tree with agents 105. The user has been able to identify particular options associated with the car that he or she is trying to sell. The user traverses the tree, with the help of the navigation agent, to identify the car's options. Importantly, the user has been able to traverse the tree in the manner best suited to that user. In contrast to other systems, the user has not been forced to select a particular set of choices in a particular order, but has been able to define options for the car that will let others help find that car. Note however, that the other users will be able to find the selling agent by following the same or a different path than was used by the user.

Figure 16:
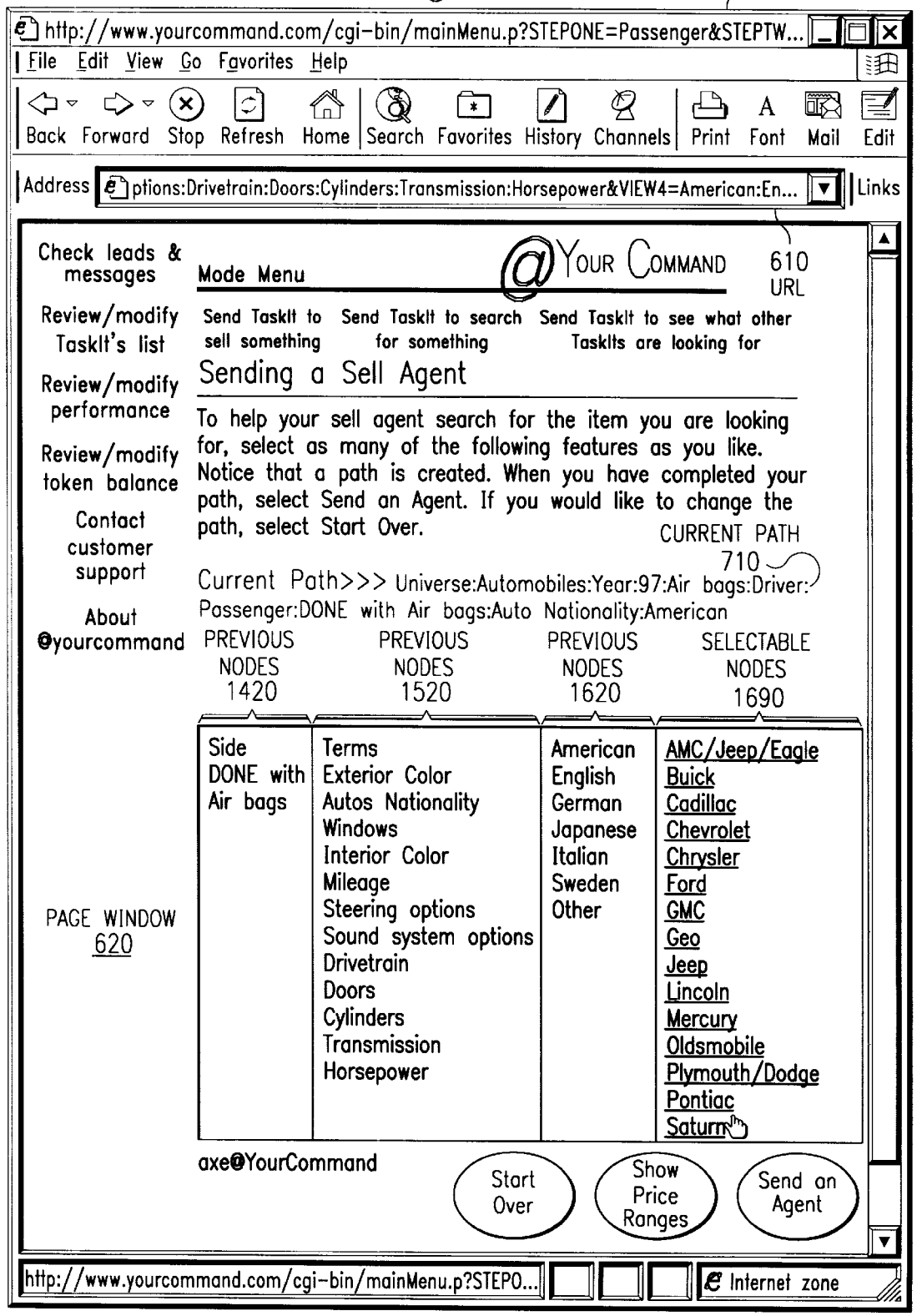

FIG. 16 includes the selectable nodes 1690 under the American node. The previous nodes 1620 include the selectable nodes from 1590. The current path 710 has been updated to include the term American. The user selects Saturn.

Figure 17:
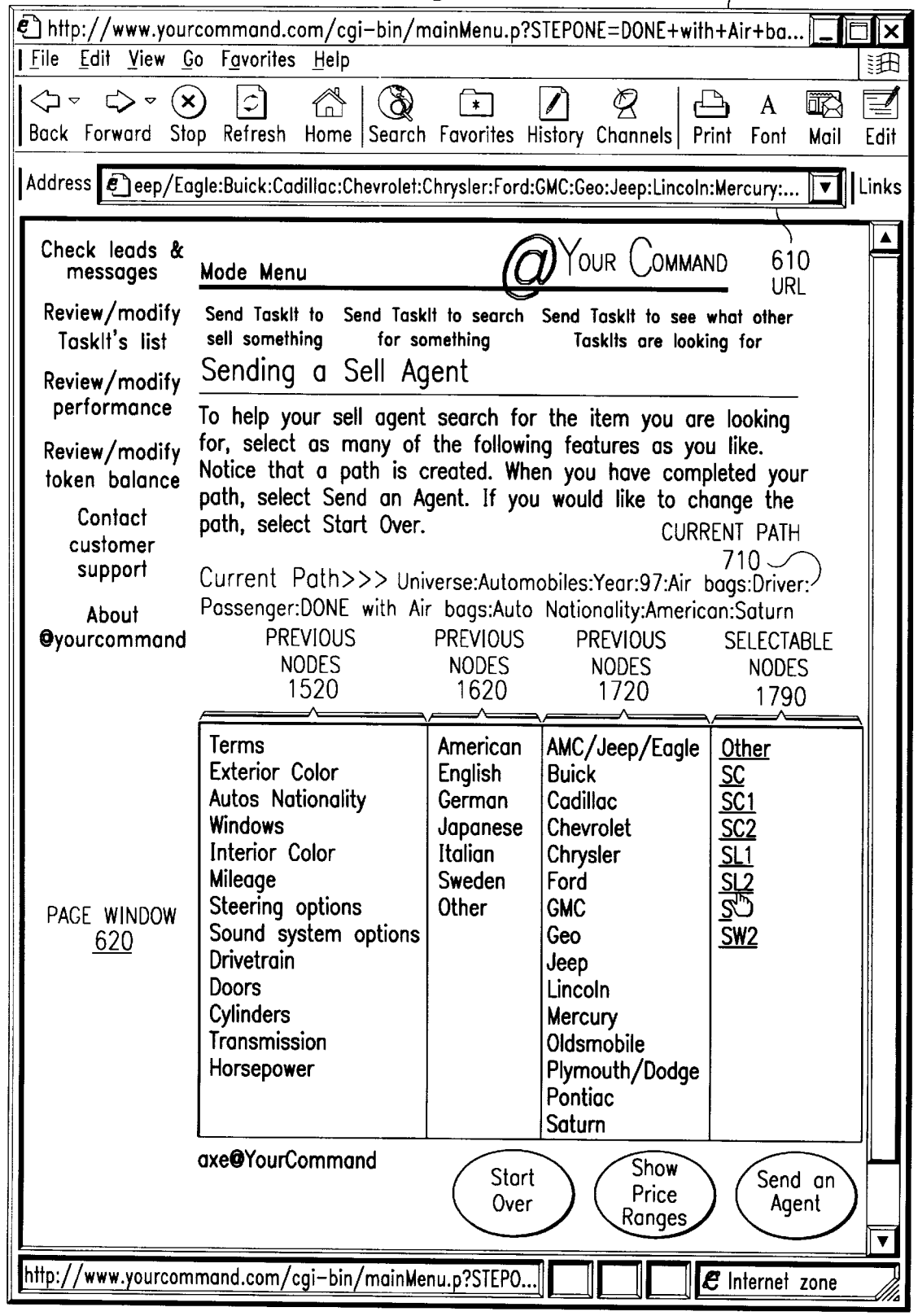

FIG. 17 illustrates the selectable nodes 1790 under the Saturn node. The previous nodes 1720 correspond to the selectable nodes 1690. The current path 710 has been updated to include the term Saturn. The user selects SL2 as the type of Saturn that they wish to sell.

Figure 18:
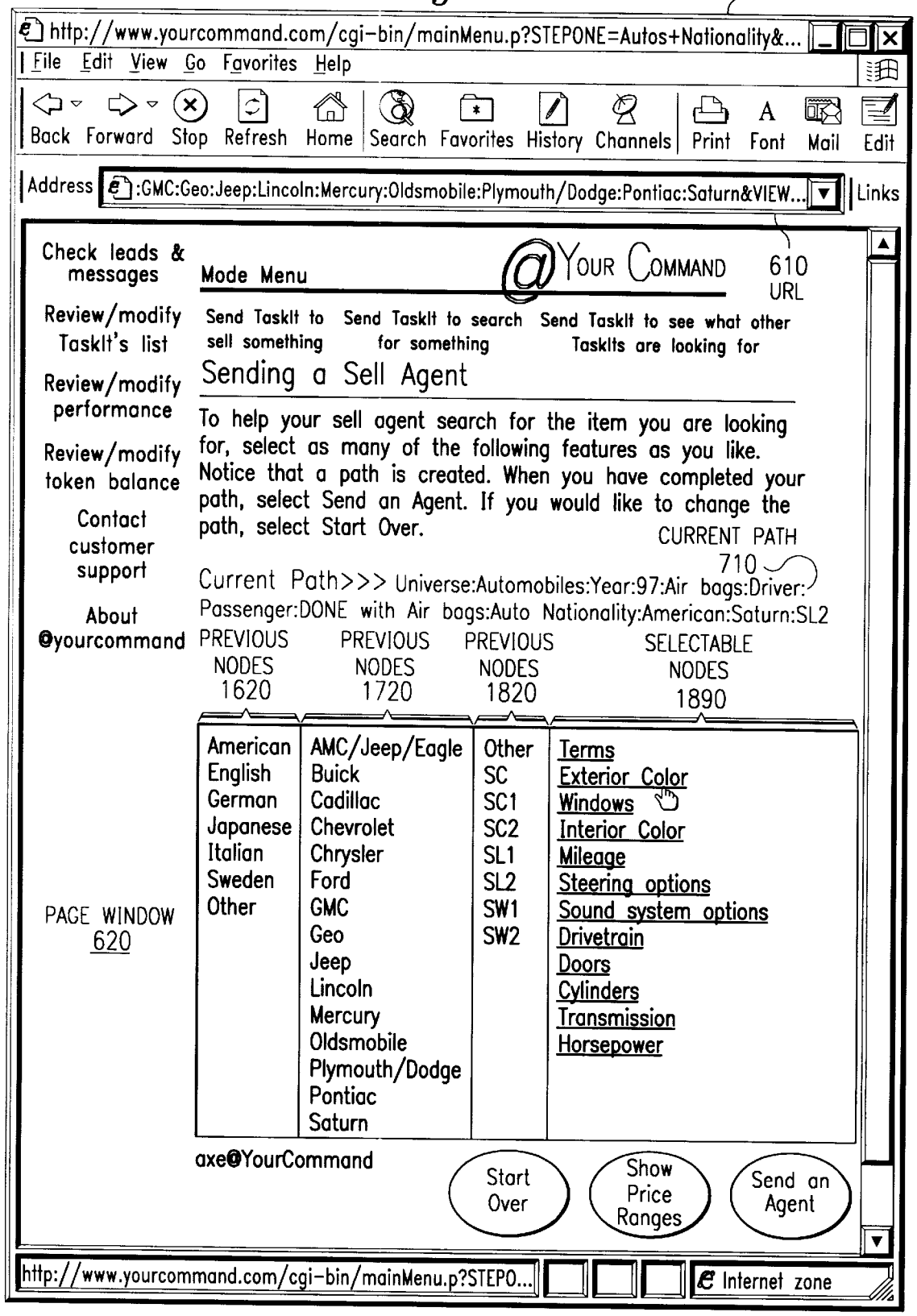

FIG. 18 illustrates the selectable nodes 1890 available for selection by the user. Note that the selectable nodes 1890 include the sibling nodes for the nodes Year, Air bags, and Autos nationality. The reason that these nodes are presented is that the nodes American, Saturn, and SL2 were all option nodes. No siblings of these nodes could be selected once these nodes had been selected. The navigation agent had stored the sibling nodes of the Year, Air bags, and Autos Nationality nodes and has caused them to be presented. The remaining sibling nodes are then presented as selectable nodes 1890. The user then selects the Exterior color node. Note that the current path 710 has been updated to include SL2.

Figure 19:
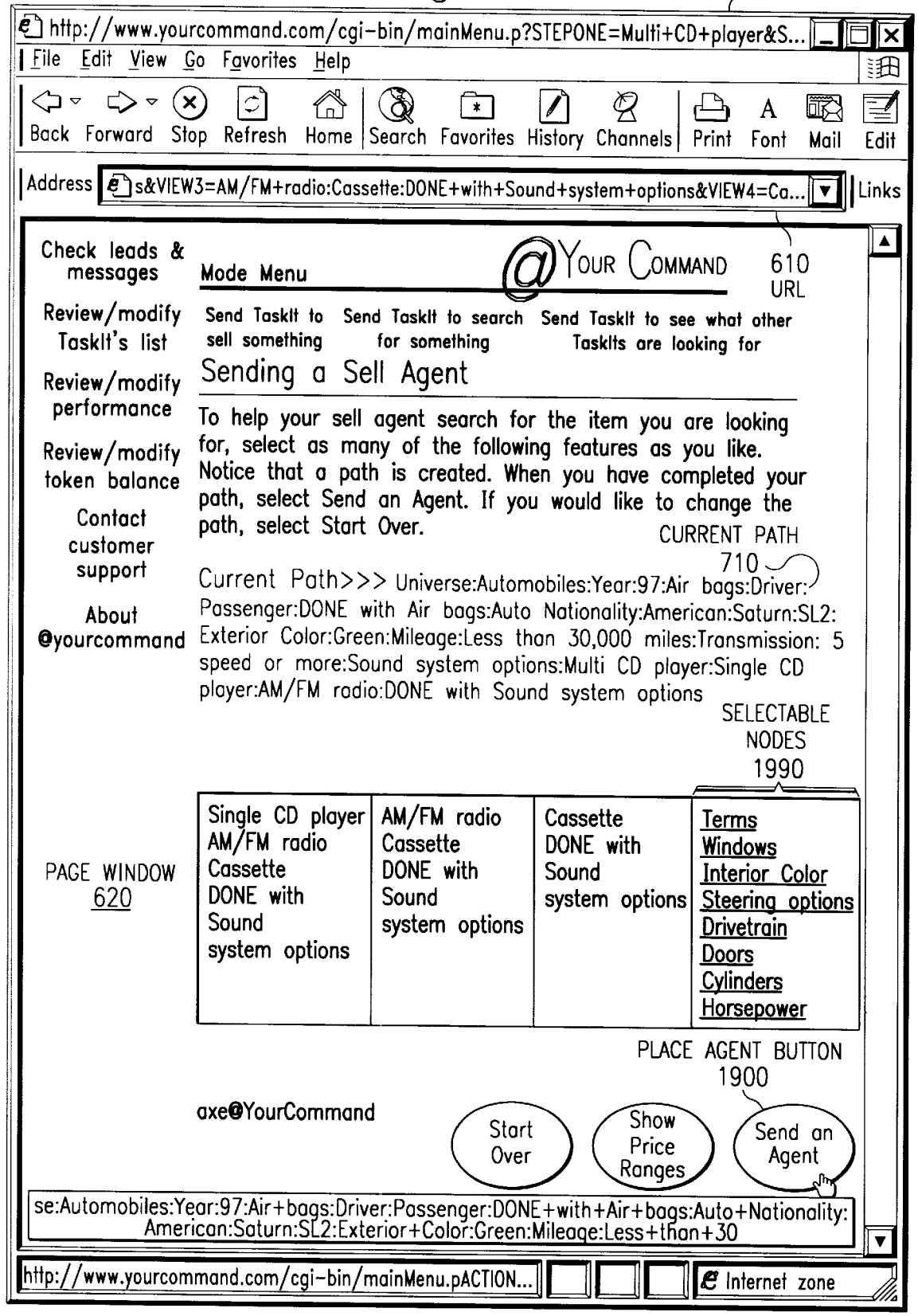

FIG. 19 illustrates the results after the user has made multiple selections. The current path 710 illustrates the path followed by the user in defining the vehicle that he or she wishes to sell. The selectable nodes 1990 still include a number of sibling nodes to the Year, Air bags, and Autos Nationality nodes. However, in this example, the user believes that he or she has sufficiently identified the vehicle. The user then selects the place agent button 1900. This indicates to the market place program 104 that the user wishes his or her navigation agent to create a sell agent having the current path.

Figure 20:
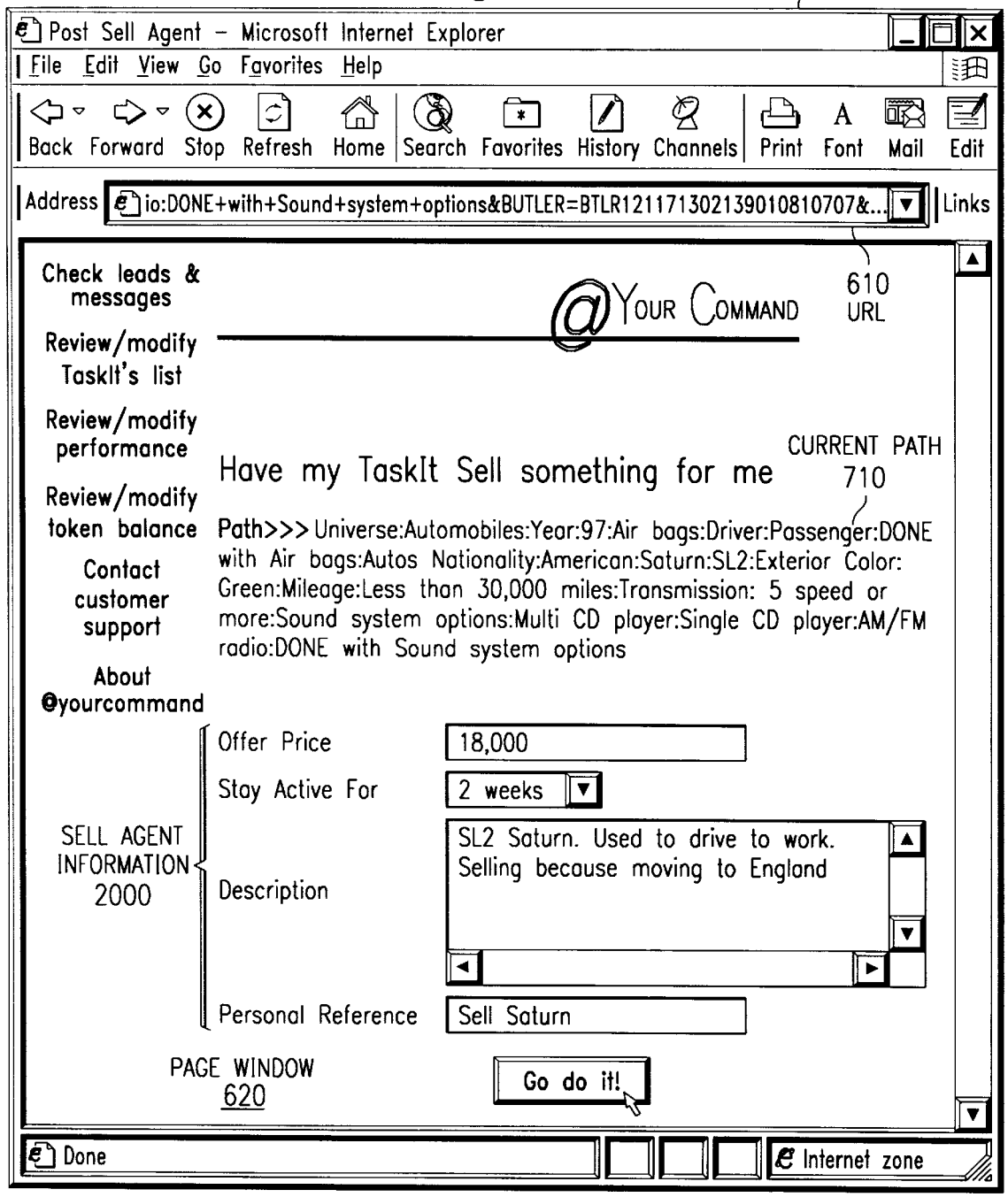

FIG. 20 illustrates the current path 710 and the sell agent information 2000 provided by the user. In this example, the user is offering to sell a vehicle having the characteristics associated with the current path 710 for $18,000. The user indicates that he or she would like the agent to stay active for two weeks. This means that the agent will continue to exist in the market place program 104 for a two week period. The user can supply additional information describing the vehicle and potentially the reasons for selling it. This information can then be reviewed by potential buyers. The user is also allowed to assign a personal reference to the agent. This will allow the user to review all of his or her agents and easily distinguish between those agents.

The user then selects the "go do it" button, causing the navigation agent to request that the market place program 104 insert a sell agent into the database 106. The market place program 104 will then retrieve the sell agent, given searches corresponding to keywords in the path 710.

h. Example of Searching for Sell Agents

Figure 21:
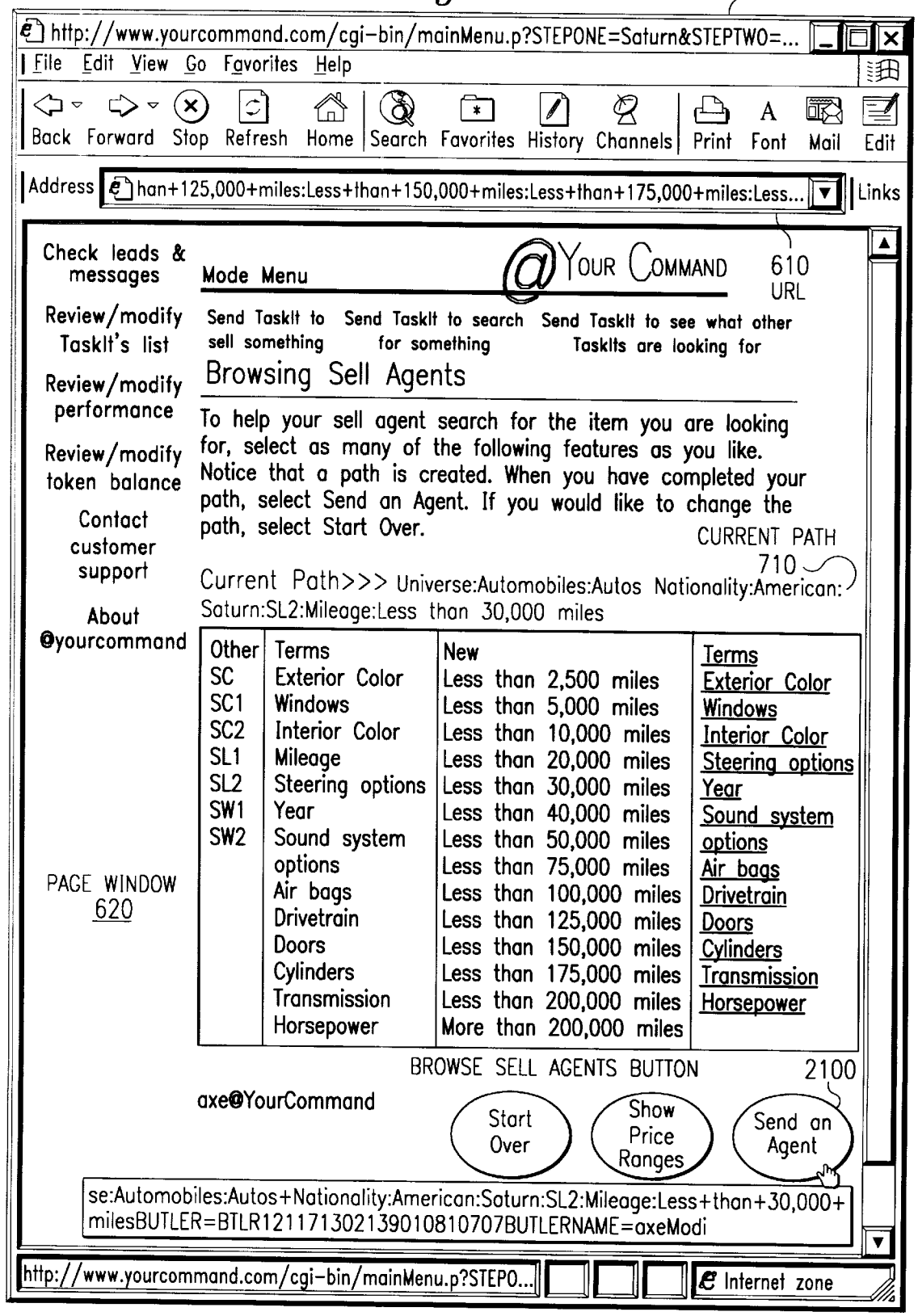
FIG. 21 through FIG. 23 illustrate the results of a user traversing the tree and searching for sell agents.

FIG. 21 illustrates the results of a user traversing the tree and generating the following current path 710: Universe: Automobiles: Autos Nationality: American: Saturn: SL2: Mileage: Less than 30,000 miles. The user now selects the browse sell agent button 2100. This will cause the navigation agent to request, from the market place program 104, all of the sell agents that have keys associated with the current path 710.

Figure 22:
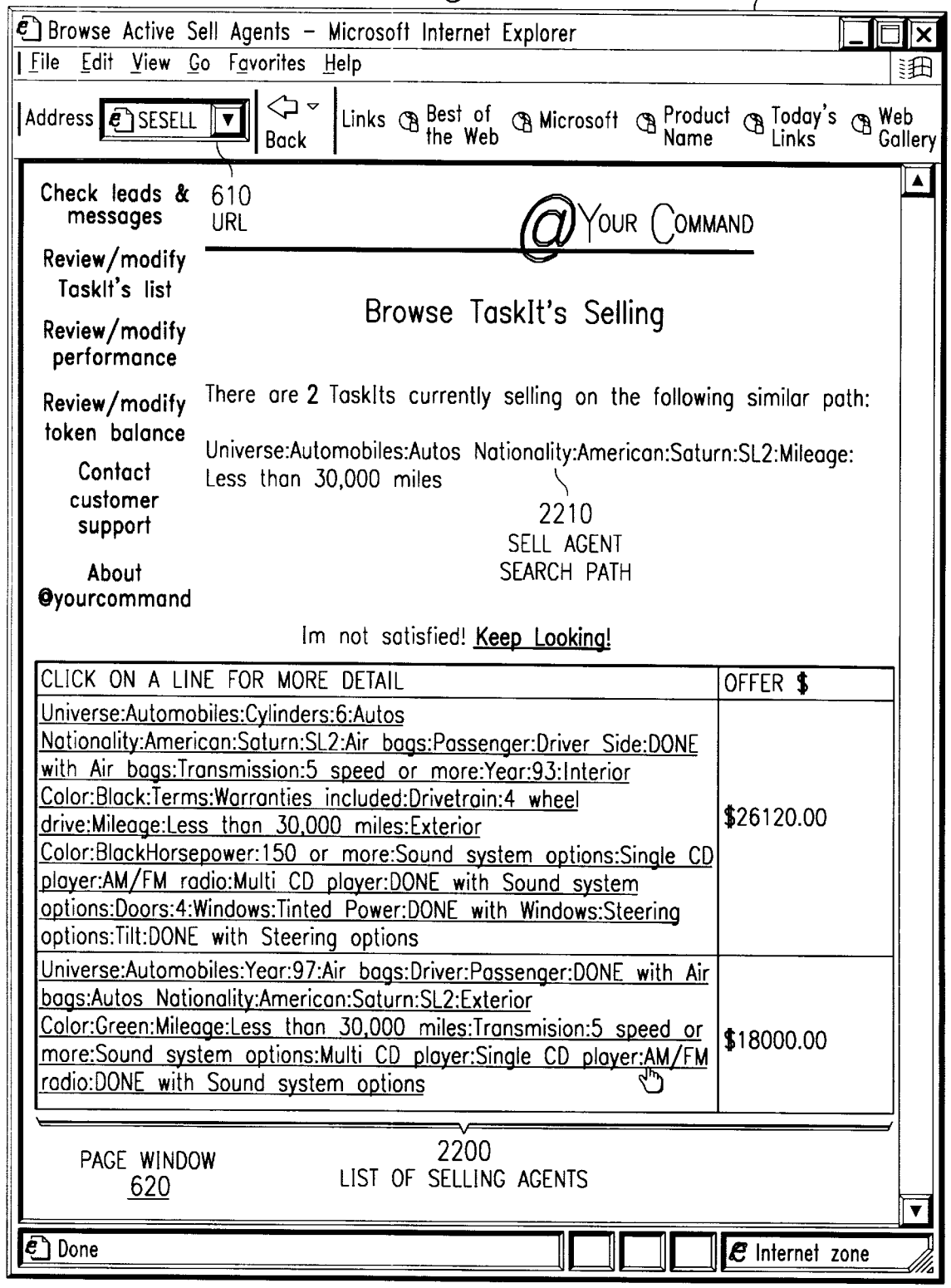

FIG. 22 illustrates the results of the search. The market place program 104 has returned an HTML page containing the list of selling agents 2200 for the sell agent search path 2210 (this corresponds to the current path 710 in FIG. 21). In this example, there are two agents available. The first agent is offered for $26,120 and has an extensive path identifying the features associated with the vehicle. A second agent is the sell agent that was placed at FIG. 20 above. Note that the user defined a different path than was defined for placing the sell agent in FIGS. 6–20. However, the navigation agent was able to find the sell agent because the two paths had a corresponding set of keys. That is, the sell agent search path 2210 is a subset of the keys used to place the sell agent in FIG. 20.

Figure 23:
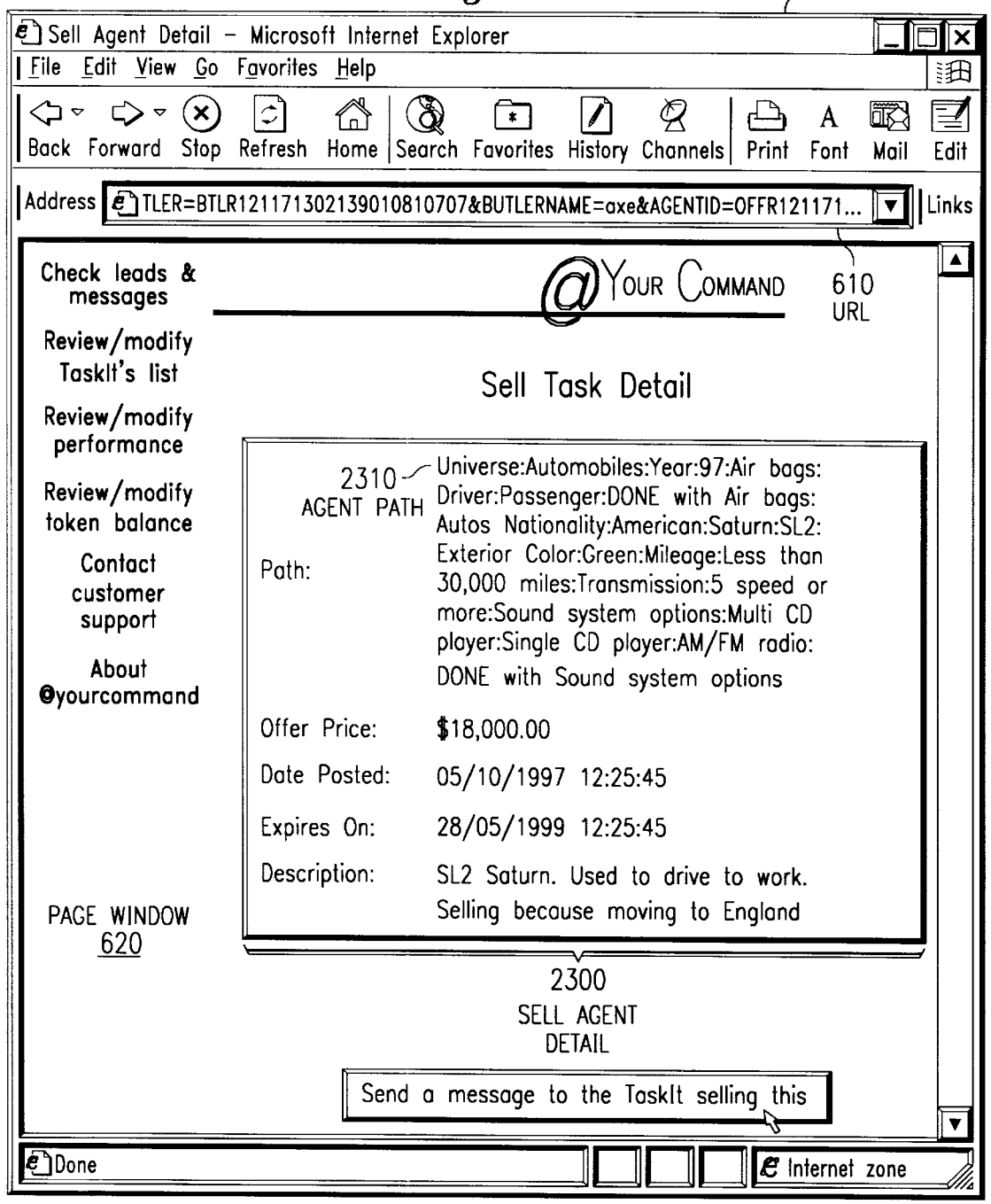

FIG. 23 shows the detailed information associated with the sell agent. The agent path 2310 corresponds to the path of the sell agent. The offer price, date posted, expiry date, and the description are also displayed. The user has the option of sending a message to the sell agent to obtain more information or to purchase the car.

i. Example of Deriving Statistical Information for Agents

Figure 24:
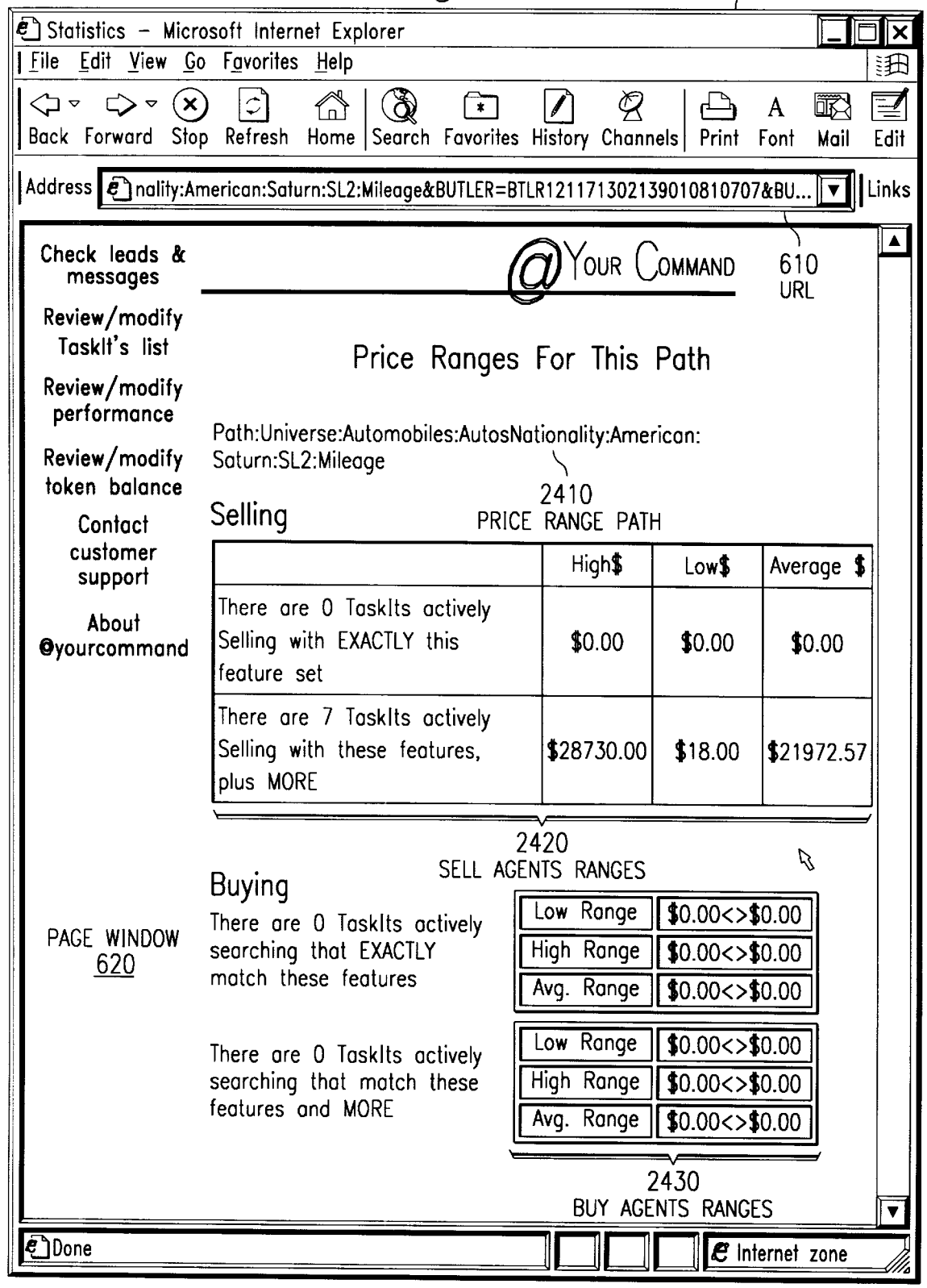
FIG. 24 illustrates the results of a request to show the price ranges of agents for a given path.

FIG. 24 illustrates the results of a request to show the price ranges of agents for a given path (the price range path 2410).

The navigation agent causes the market place program 104 to display a list of the selling agents that have exactly the same feature set as the price range path 2410 dictates. Also listed are a number of sell agents with more features than the path specifies. These are listed as the sell agent ranges 2420. The range of prices for these agents is also shown.

The navigation agent also causes a display of the buy agent ranges 2430. These ranges indicate which buy agents exist that have keys similar to those in the price range path 2410.

j. Example of Searching for Buy Agents

Figure 25:
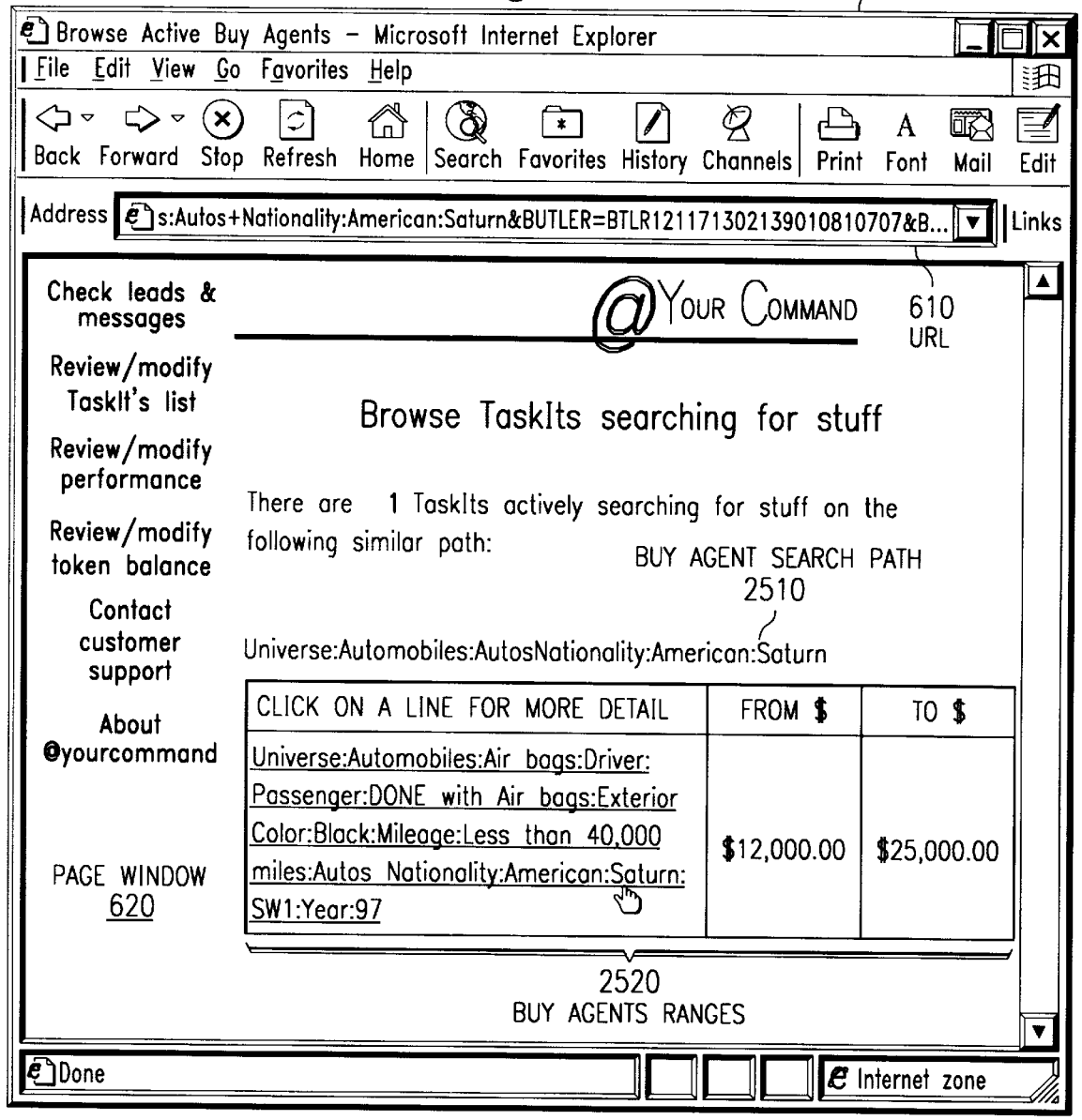
FIG. 25 and FIG. 26 illustrate searching for buy agents.

FIG. 25 illustrates searching for buy agents in the buy agent search path 2510. The buy agent ranges 2520 are also displayed. The search was performed by the market place program 104 using the keys from the buy agent search path 2510.

Figure 26:
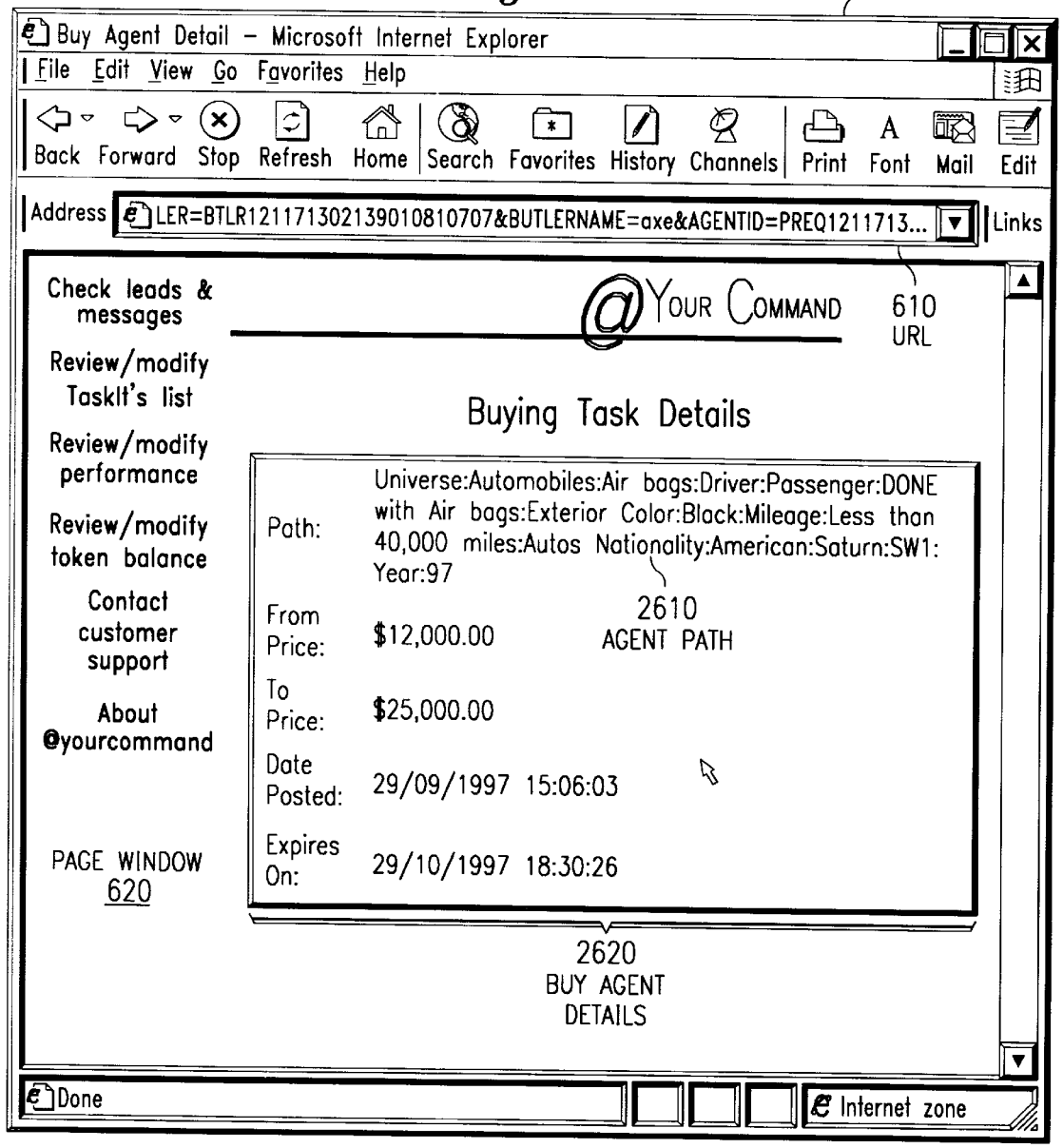

FIG. 26 illustrates the buy agent selected from FIG. 25. The agent's specific path is shown as agent path 2610. The buy agent details 2620 list the path of the agent, the range of prices of interest to the user, the date posted, and the expiry date of the agent.

k. Forwarding to Other Sites

Figure 27:
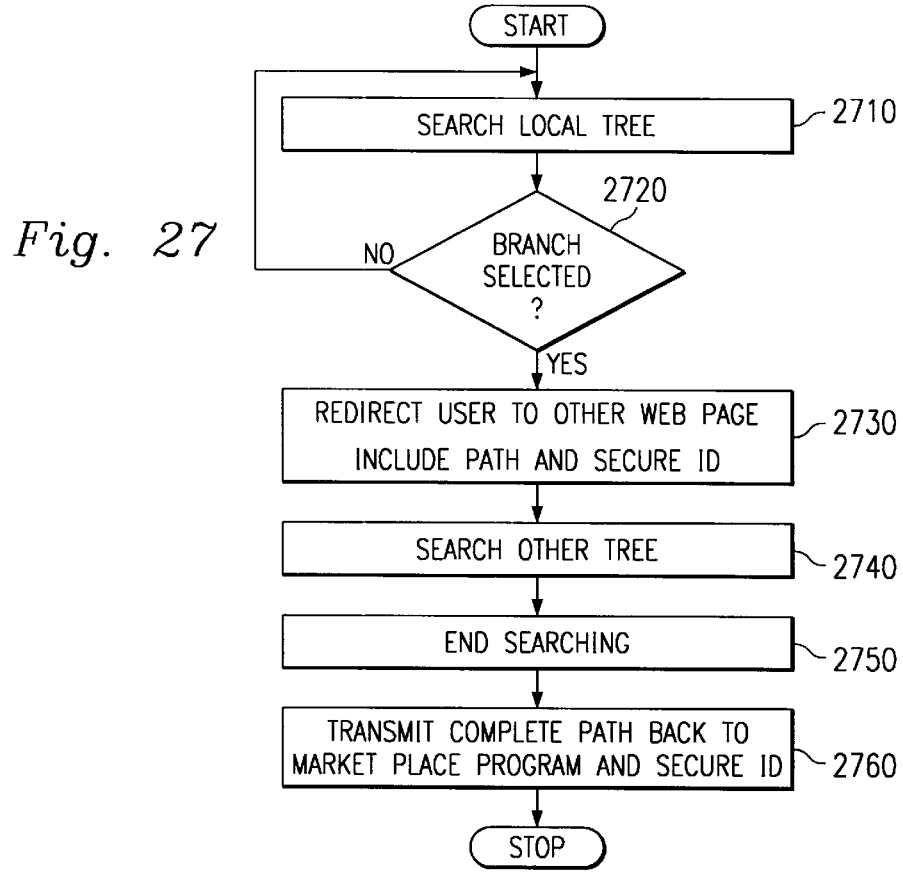
FIG. 27 illustrates one example of searching on multiple web sites.

FIG. 27 illustrates an example of the navigation agent forwarding the user to another web site and the results of any actions performed at the web site being returned the market place program 104. Many variations of this type of searching are possible within the market place program 104 and the Internet 130. FIG. 27 illustrates but one example of a type of searching.

At block 2710, the user searches the taxonomy tree with agents 105 as described above. If the user does not select a redirecting node or URL associated with a node, then the user continues to search the local tree. A redirecting node is a node that automatically redirects the user to another web site.

At block 2720, if the user selects a node that links to another web page, or explicitly links to a separate web address, then the navigation engine notifies the market place program 104.

At block 2730, the navigation agent causes the market place program 104 to redirect the user to the other web page, at block 2730. The redirection also includes the existing path information for use by the other server and also the identity of the navigation agent. (In some examples, the server 100 is operating as the server for both the market place program 104 and the other web site.) In one embodiment, the redirection includes the address of an executable program on the other server, such as the CGI, and options for that program. These options include the path followed by the user and the ID of the navigation agent.

The server at the other web site uses the path and secure ID in many different ways, depending on the server's capabilities. For a basic server, the path can be used to identify preferences that will enable the user to more quickly find what the user is searching for. For advanced servers, supporting market place programs, those servers can instantiate a new navigation agent for the user with the path provided during the redirection. This second server is the type being connected to by the user in the example of FIG. 27. Therefore, at block 2740, the user can continue searching the tree at the other web site to find what the user is looking for. This process could repeat through multiple Web sites until the user has found the desired product.

In some embodiments, the user can purchase products at the other web site using the navigation agent's identity, a unique identity corresponding to that user in the market place program 104, or a temporary identity for the user. The system uses a secure third party privacy system for sending the products to the user without the supplier knowing the identity of the user. Such a system is described in the United States Patent application entitled, "Third Party Privacy System," application Ser. No. 60/050,411, filed Jun. 20, 1997, having inventors Douglas L. Peckover and Jeffrey M. Zucker.

In this example, the user ends his or her searching of the other tree at block 2750. This may be because the user found what they were looking for, placed an agent at the particular location of the tree in the other server, or otherwise decided to stop searching.

As a result of the termination of the searching at block 2750, the other server communicates back to the server 100. The communication can include any additional path information generated on the other server, and the identity of the navigation agent provided at block 2730 The communication can also include information about whether the user bought or sold any items. Thus, the market place program 104 can update the database 106 with the path information and the results of the search on the other tree. This communication back to the main server is performed at block 2760.

As a result of receiving the path from the other tree and the secure ID, the market place program 104 can store the searching information for use by that user or by marketing analysis tools.

l. Marketing Analysis Tools

The market place program 104 also includes a number of tools for analyzing the results of the searches by users. Histories of searches, conversion rates, and purchasing habits are all examples of information that can be retrieved from the database 106 for use by potential buyers or sellers. Additionally information about goods and services being sought and being offered can also be determined from the agents existing in the tree. Additionally, marketing communications programs can be established and estimates of costs for those programs can be determined using the information provided by users. These tools are described in greater detail in the United States provisional patent application entitled, "Analysis and Communication Tools for a System," application Ser. No. 60/057,685, filed Aug. 27, 1997, having inventor Douglas L. Peckover.

m. Additional Embodiments

The following describes additional embodiments of the invention.

The client 110 and the client 120 can provide many different types of applications to interface to the market place program 104. For example, in one embodiment, the market place interface application 114 is a Java based application where the entire tree is stored and traversed. Only when the navigation agent, running on the market place interface application 114, requires a search of the database 106, is there a connection made between the client 110 and the server 100. In other embodiments, the market place interface application 114 keeps only a portion of the tree. As the user traverses the tree, the market place interface application 114 requests additional parts of the tree. That is, the market place interface application 114 will cache portions of the tree for immediate use by the client.

In another embodiment, the browser application 124 is provided with Java, or Java Script, instructions to remember the order of selections presented to the user. The user may select multiple options under one node. The order of selection of those options is stored and transferred to the market place program 104. This reduces the number of connections required between the client 120 and the server 100, thereby reducing the bandwidth requirements of the system and reducing the load on the server 100. In another embodiment, the order of selections of child nodes, under a given node, is not remembered by the browser application 124. However, the user can still select a number of nodes under a current node before causing a connection to the server. The order of these choices is not stored in the database 106. Thus some information may be lost about the choices made by the users. In another embodiment, the order of selection for some child nodes will be stored, while for others the information will not be stored. The tree designer can define this for each node in the tree.

In another embodiment, the user can begin a search using some keyword searching techniques. The user is presented with a number of different possible paths and nodes in the tree. The user then selects one of these paths and is sent to the corresponding node, or one of the corresponding nodes, in the tree. This allows the user to take a shortcut to a particular part of the tree, however, some valuable choice information may be lost. In a similar embodiment, the user can select a banner advertisement which will cause the corresponding navigation agent to move to a corresponding path.

To help a user determine how much specificity is required to express his or her needs adequately, in some embodiments, a user can request that all the nodes below a point in the path be displayed. This number of nodes will decrease as the user continues to navigate down a path. In one embodiment, a running total of the number of nodes below the current node in the path is displayed for the user. In another embodiment, the total number of web site links and agents for both buying and selling are displayed. These features help the user better identify when he or she should stop navigating the tree and take action on the web sites or agents for that path.

In conclusion, an integrated search and communication system has been described using some exemplary embodiments. However, the above description is not meant to limit the scope of the invention. The invention is defined by the scope of the claims.

What is claimed is:

1. A method of storing prospective and actual buying and selling information using a computer system, said method comprising:

accessing a first data structure, said first data structure including a set of nodes, said set of nodes having nodes with parent node and child node references;

selecting, by a software agent, a subset of said set of nodes including selecting a first node of subset of nodes, said first node having a parent node, said first node being a child node of said parent node, said parent node having a second child node, during said selecting of said subset of nodes, determining whether a selection of said second child node is possible upon selection of said first node and using said determination to allow or disallow the selection of said second child node;

recording a list of node selections corresponding to said subset of nodes;

extracting a set of terms corresponding to said list, wherein said set of terms correspond to product/service information;

a first program for receiving a series of communications, each communication defining a node to be selected;

said first program for accessing said first data structure and for determining a set of selectable nodes upon receipt of a communication;

said first program for causing a presentation about said set of selectable nodes;

storing said first data structure including storing said list of nodes in said first data structure;

storing said first data structure including using said set of terms as keys to index said first data structure in a data base;

storing a second data structure including said set of terms.

2. The method of claim 1 wherein said recording said list of node selections includes storing a path indicating an order of selection.

3. The method of claim 1 wherein said determining includes testing the type of parent node to determine whether said parent node will allow for the selection of multiple child nodes of said parent node.

4. The method of claim 1 wherein said determining includes testing whether said first node will allow for the selection of multiple child nodes of said parent node.

5. The method of claim 1 wherein said determining includes testing whether said parent node is a multinode, a category node, or an option node and if said parent node is a multinode, allowing selection of said second child node upon selection of said first child node.

6. The method of claim 1 wherein extracting said set of terms includes testing each node in said list of nodes to determine whether said node is associated with a term and including each associated term in said set of terms.

7. The method of claim 1 further including creating said second data structure and said software agent including said information including an offer price, a time period, and a description, said time period defining the time period for which the agent should be stored, the description defining a product being offered.

8. The method of claim 1 further including creating said second data structure and said software agent including said information including a buy price range, a time period, and a description, said buy price range indicating a price range that a user is willing to pay for a product, said time period defining the time period for which the agent should be stored, the description defining a product being sought.

9. The method of claim 1 further including creating said second data structure and said software agent including said information including an event definition and an action definition, said event definition defining an event upon which said agent should act, and said action defintion defining the action to be taken by said agent upon the occurrence of the event.

10. The method of claim 9 wherein said event definition defines the event as a second set of nodes are selected that correspond to a superset of said set of terms and wherein said action definition defines that the creator of said agent should be notified.

11. The method of claim 9 wherein said action definition defines that a user should be emailed with a notification that the event defined by said event definition has occurred.

12. A computer system for storing prospective and actual buying and selling information, said computer system comprising:

a server including a first program and a database, said first program for providing accessing to a first data structure, said first data structure for organizing access by a plurality of software agents to said database and for storing a record of paths said software agents used to traverse said first data structure, said first data structure allowing the selection of multiple alternative paths from some point in the first data structure and not allowing the selection of multiple alternative paths from another point in the first data structure;

a client including a second program, said client being coupled in communications with said server, said second program for presenting data from said server about said first data structure and possible paths available from a point in said first data structure, said second program for receiving selection signals, said selection signals identifying choices taken between alternative paths to traverse said first data structure; and wherein said server further includes a second data structure, said second data structure being associated with a path used to traverse said first data structure, said second data structure having been stored in response to a request by said second program to store said second data structure with said path.

13. The computer system of claim 12 wherein said server includes an internet server, said second program includes a browser program, and said information is communicated between said internet server and said browser program.

14. The computer system of claim 12 wherein said database includes a relational database and where said path is used to index said second data structure in said relational database.

15. The computer system of claim 12 wherein said second program includes a browser program and wherein said browser has an URL for accessing said server, said URL including a definition of said path for said second data structure, said definition of said path allowing said second program to request a retrieval of all data structures associated with said path.

16. The computer system of claim 12 wherein said software agent includes information including a offer price, a time period, and a description, said time period defining the time period for which the agent should be stored, the description defining a product being offered.

17. The computer system of claim 12 wherein said software agent includes information including a buy price range, a time period, and a description, said buy price range indicating a price range that a user is willing to pay for a product, said time period defining the time period for which the agent should be stored, the description defining a product being sought.

18. The computer system of claim 12 wherein said software agent includes information including an event definition and action definition, said event definition defining an event upon which said agent should act, and said action definition defining the action to be taken by said agent upon the occurrence of the event.

* * * * *

UNITED STATES PATENT AND TRADEMARK OFFICE
CERTIFICATE OF CORRECTION

PATENT NO. : 6,286,002 B1　　　　　　　　　　　　　　　　　　　　　　　Page 1 of 1
APPLICATION NO. : 08/970470
DATED : September 4, 2001
INVENTOR(S) : Jack Axaopoulos et al.

It is certified that error appears in the above-identified patent and that said Letters Patent is hereby corrected as shown below:

Title Page:

At Related U.S. Application Data (60), before "Provisional application No. 60/057,658" please insert -- Continuation-in-part of application No. 08/784,829, filed on Jan. 17, 1997, U.S. Patent No. 6,119,101, provisional application No. 60/010,087, filed Jan. 17, 1996 --.

Signed and Sealed this

Sixth Day of November, 2007

JON W. DUDAS
*Director of the United States Patent and Trademark Office*